US006298159B1

(12) United States Patent
Tukagoshii et al.

(10) Patent No.: US 6,298,159 B1
(45) Date of Patent: Oct. 2, 2001

(54) METHOD AND DEVICE FOR FORMING/PROCESSING CHARACTER STRING IMAGE

(75) Inventors: Shinichi Tukagoshii, Shiojiri; Kenji Watanabe; Tomoyuki Shimmura, both of Tokyo-to, all of (JP)

(73) Assignees: Seiko Epson Corporation; King Jim Co., Ltd., both of Tokyo (JP)

( * ) Notice: Subject to any disclaimer, the term of this patent is extended or adjusted under 35 U.S.C. 154(b) by 0 days.

(21) Appl. No.: 09/188,578

(22) Filed: Nov. 9, 1998

(30) Foreign Application Priority Data

Nov. 10, 1997 (JP) .................................................. 9-325372

(51) Int. Cl.⁷ ...................................................... G06K 9/72
(52) U.S. Cl. ................................................................ 382/229
(58) Field of Search .................................... 382/229, 230, 382/231, 228, 227, 226, 224, 220, 177, 282, 284, 286, 293, 295, 298, 300

(56) References Cited

U.S. PATENT DOCUMENTS 5,212,739 * 5/1993 Johnson ..................................... 382/9
5,216,725 * 6/1993 McCubbrey .............................. 382/9
5,321,770 * 6/1994 Huttenlocher et al. ................. 382/22

FOREIGN PATENT DOCUMENTS 5104810    4/1993  (JP) ................................ B41J/21/00

* cited by examiner

Primary Examiner—Andrew W. Johns
Assistant Examiner—Seyed Azarian
(74) Attorney, Agent, or Firm—Hogan & Hartson, LLP

(57) ABSTRACT

There are provided a method and device for forming a character string image in a predetermined image area based on a plurality of character images each occupying an area for one character, each of the character images being formed of an actual character image and blank images arranged on horizontally opposite sides of the actual character image in a manner immediately adjacent thereto. Actual character images are taken out from the character images, respectively. The thus taken-out actual character images are arranged in the predetermined image area according to a desired sequence, to thereby form the character string image. The thus formed character string image is handled as an equivalent to an image of one character.

16 Claims, 29 Drawing Sheets

F I G. 6
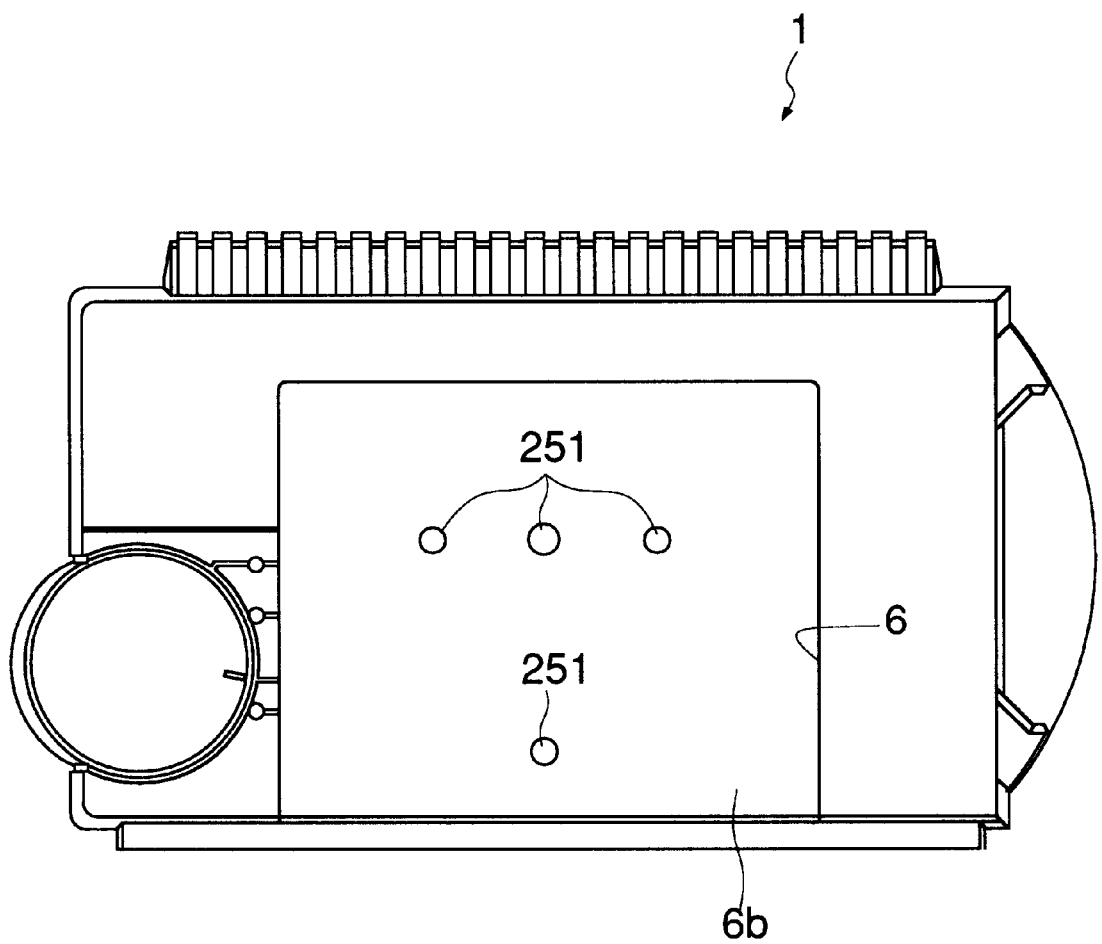

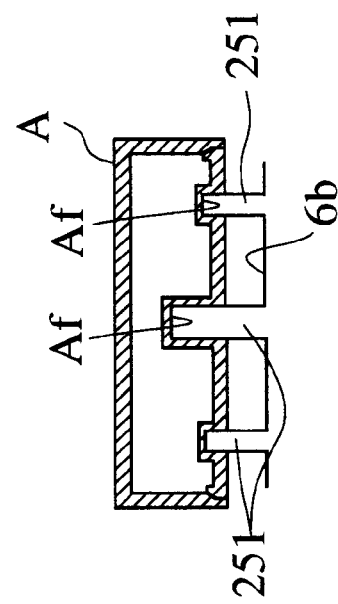
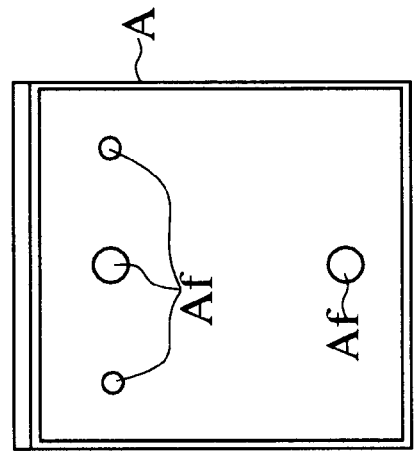
FIG. 7A
FIG. 7B
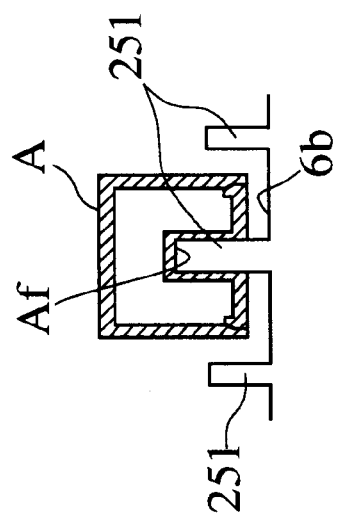
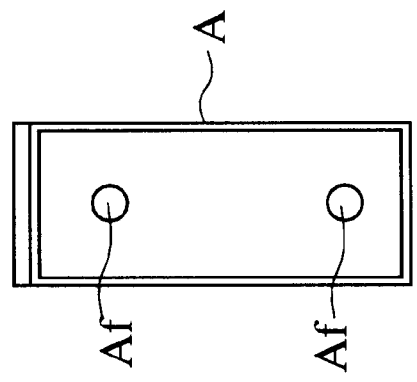

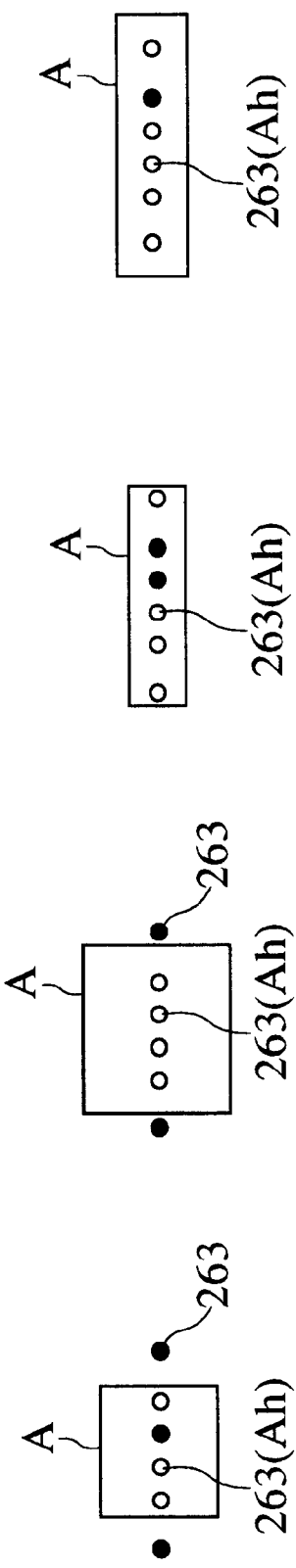
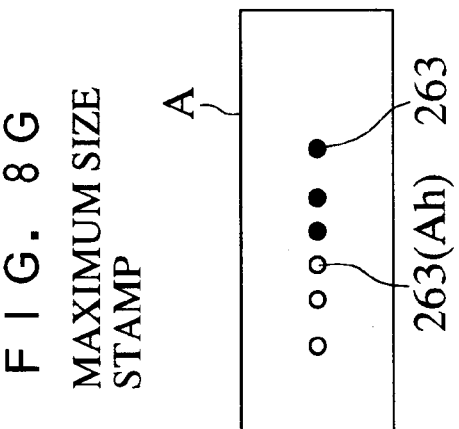
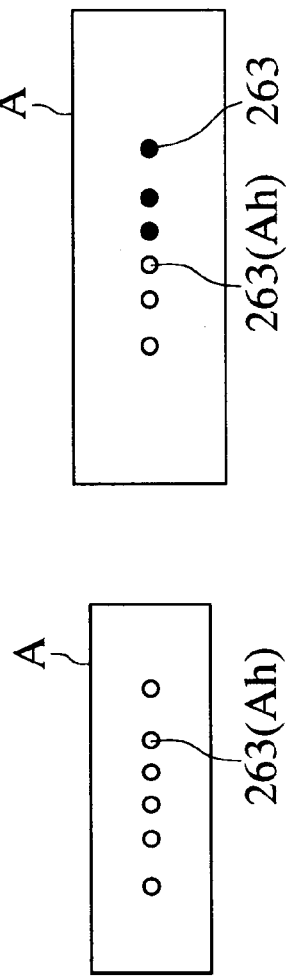
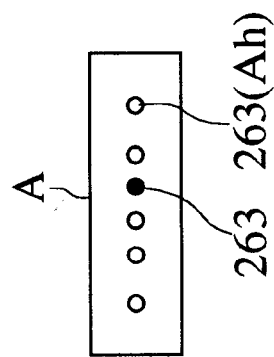

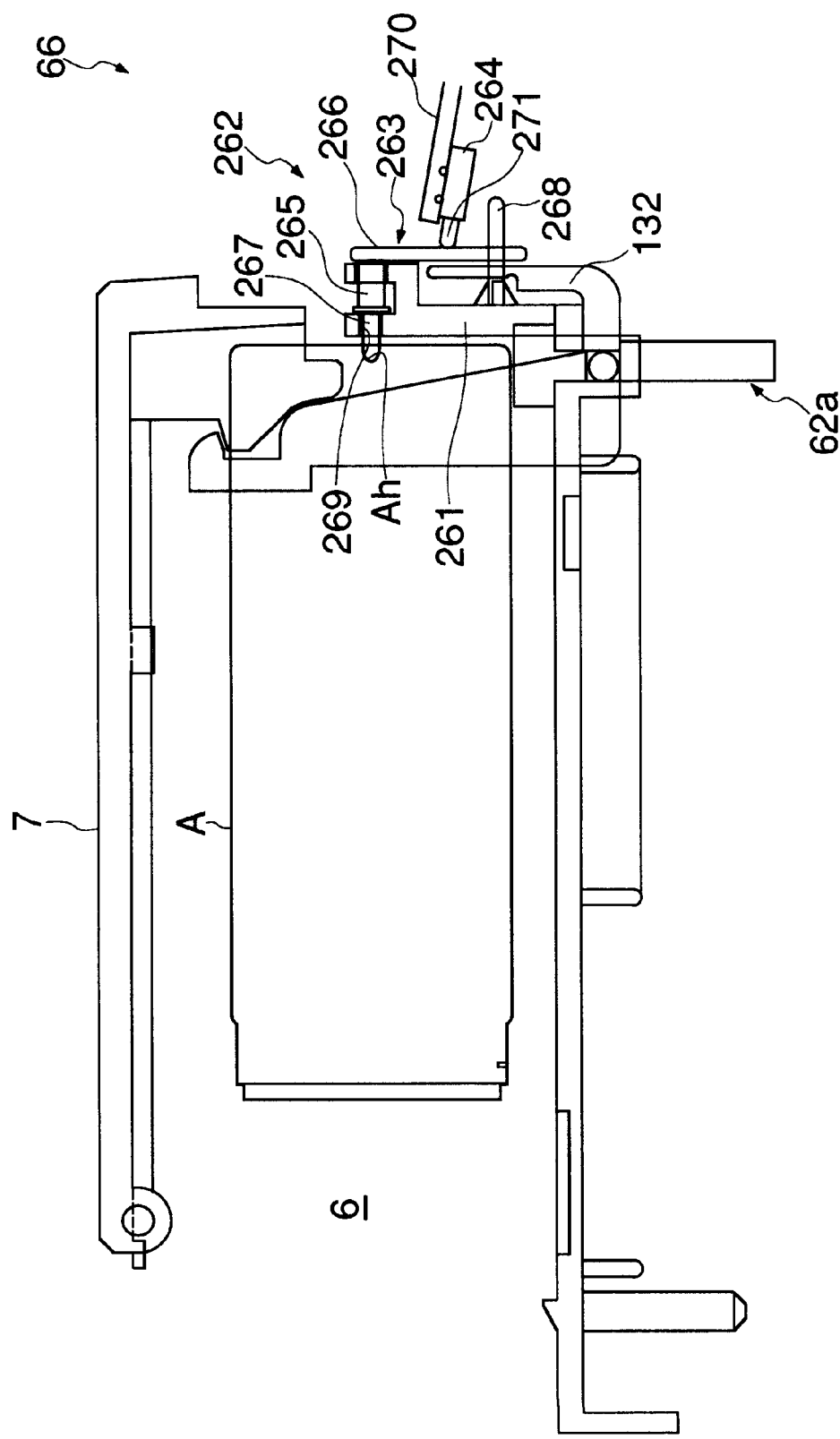

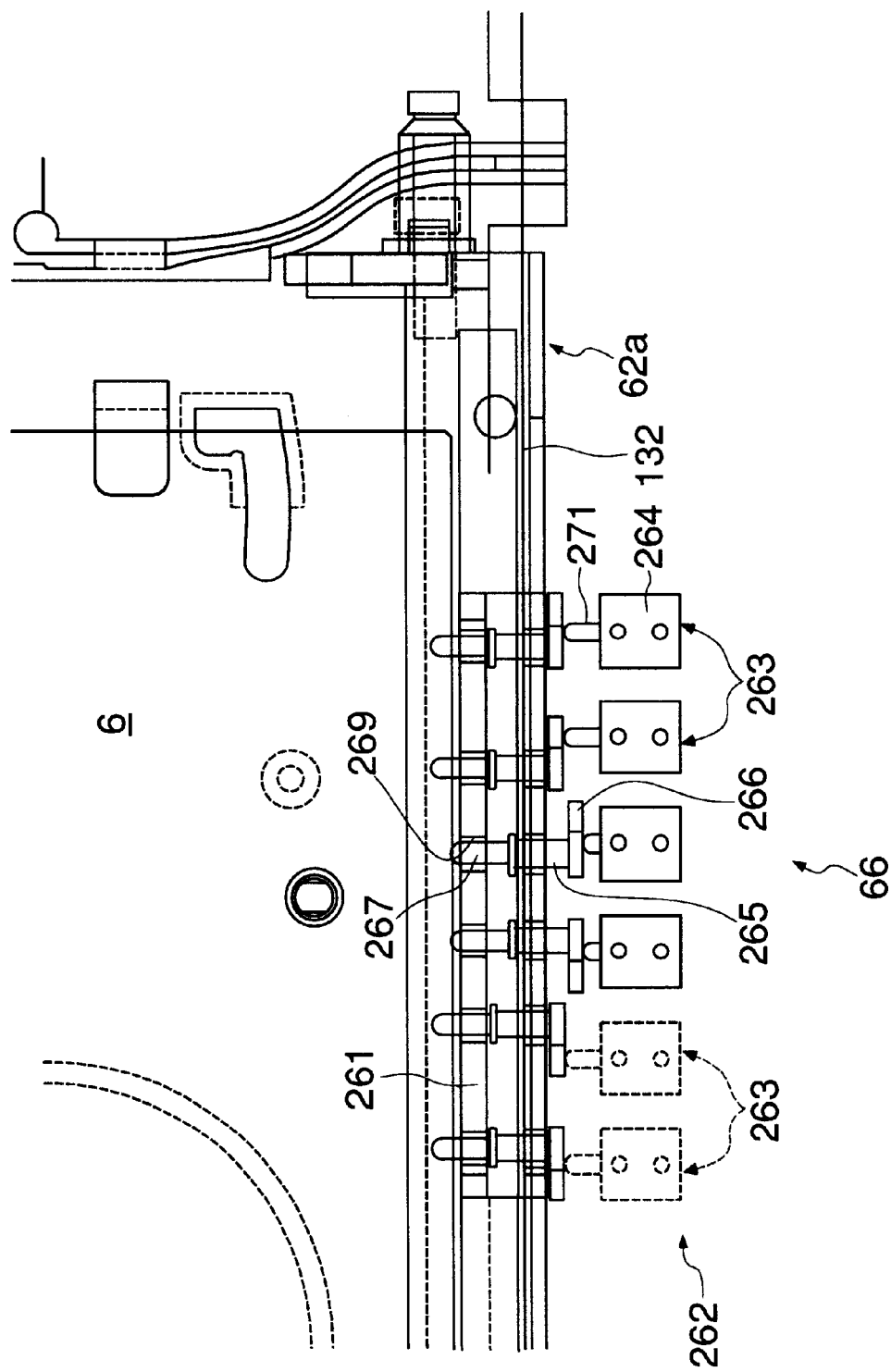

FIG. 14A 1-24-247 Kasumigaseki, Chiyoda ward

FIG. 14B 1-24-247 Kasumigaseki, Chiyoda ward

FIG. 15A     FIG. 15B $\boxed{\tfrac{1}{2}}2$     $\boxed{\tfrac{1}{2}}4$

FIG. 16

$\boxed{\tfrac{1}{3}}0\boxed{\tfrac{1}{3}}1\boxed{\tfrac{1}{3}}2\boxed{\tfrac{1}{3}}3\boxed{\tfrac{1}{3}}4\cdots\boxed{\tfrac{1}{3}}9$

REDUCE TO 75%

REDUCE TO 50%

REDUCE TO 75%

REDUCE TO 50%

↓ REDUCE TO 50%

Kasumigaseki, Chiyoda ward

Kasumigaseki, Chiyoda ward

METHOD AND DEVICE FOR FORMING/PROCESSING CHARACTER STRING IMAGE

BACKGROUND OF THE INVENTION

1. Field of the Invention

This invention relates to a method of forming a character string image in a predetermined image area based on a plurality of character images during a screen display process or a print display process carried out by an electronic apparatus or the like.

2. Prior Art

A character image in a dot matrix font or an outline font used in a personal computer, a printer or the like has blank images (blank portions) arranged on opposite sides of an image of an actual character portion (referred to as "the actual character image" throughout the specification).

When an image of a character string is formed, blank images are provided in dependence on the character width of each actual character image by taking the shape of each character into account, so as to prevent a string or sequence of characters from looking irregular in juxtaposition. It should be noted that the actual character image includes one which still has small amounts of blank images on opposite sides of a character image thereof.

FIG. 37A shows a character string image of "123" formed in an image area R1 for three characters. As shown in the figure, the character string image is formed by horizontally arranging three character images of "1", "2" and "3" in the image area R1 in a manner immediately adjacent to each other without forming any gap therebetween, and each character image has blank images K1, K2 and K3 provided on opposite sides of the actual character image thereof.

When the character string image is created in an area larger than an image area for the number of characters thereof, spaces (blanks) are inserted between "1" and "2" and between "2" and "3". On the other hand, when a character string image is formed in an image area for a smaller number of characters than the number of characters of the character string, for instance, when the character string image of "123" is formed in an image area R2 for two characters or an image area R3 for one character, as shown in FIGS. 37B and 37C, each character image of the character string image "123" is reduced in a horizontal dimension to two-thirds of the original image or one-third of the same to form a character string image in the image area R2 or R3.

As described above, when an image of a character string is formed in an image area provided for a smaller number of characters than the number of characters of the character string, each character image is reduced in size as a whole. That is, each character image including the blank images is reduced to reduce the width of each actual character image, so that the appearance of the character string image thus formed is degraded in appearance.

Particularly, as shown in FIG. 37C, when the character string image "123" comprised of three characters is formed in the image area R3 for one character, each actual character image thereof is made even smaller in width to make the character string image shabby as a whole, and hence even more degraded in appearance.

SUMMARY OF THE INVENTION

It is a first object of the invention to provide a character string image-forming method and device which are capable of forming a character string image without spoiling the appearance of the image, even when the image is formed in an image area for a smaller number of characters than the number of characters of the character string.

It is a second object of the invention to provide a character string image-processing method and device which are capable of forming a character string image without spoiling the appearance of the image, even when the image is formed in an image area for a smaller number of characters than the number of characters of the character string.

To attain the first object, according to a first aspect of the invention, there is provided a method of forming a character string image in a predetermined image area based on a plurality of character images each occupying an area for one character, each of the character images being formed of an actual character image and blank images arranged on horizontally opposite sides of the actual character image in a manner immediately adjacent thereto.

The method according to the first aspect of the invention is characterized by comprising the steps of:

taking out actual character images from the character images, respectively; and arranging the thus taken-out actual character images in a desired sequence in the predetermined image area, to thereby form the character string image.

To attain the first object, according to a second first aspect of the invention, there is provided a character string image-forming device for forming a character string image in a predetermined image area based on a plurality of character images each occupying an area for one character, each of the character images being formed of an actual character image and blank images arranged on horizontally opposite sides of the actual character image in a manner immediately adjacent thereto.

The character image-forming device according to the second aspect of the invention is characterized by comprising:

storage means for storing image data items of the respective character images;

reading means for reading out actual character image data items representative of actual character images from the respective image data items; and arrangement means for arranging actual character images corresponding to the thus read-out actual character image data items in a desired sequence in the predetermined image area.

According to the method and device for forming a character string image, first, actual character image data items representative of actual character images are read out by the reading means from the storage means storing image data items of character images, whereby the actual character images are taken out from the plurality of character images. Then, the arrangement means arranges the actual character images in a desired sequence in a predetermined image area to thereby form a character string image. As described above, the character string image is created by using actual character images each having a smaller character width than the character width of each of the other character images of the character string image, so that even when the character string image is to be formed in an image area for a smaller number of characters than the number of characters of the character string, there is almost no need to reduce each character image (actual character image). As a result, the character string image can be formed in the predetermined image area without spoiling the appearance of the same. On the other hand, it is possible to produce a character string image comprised of a larger number of characters (actual character images) in the predetermined image area. It should be noted that character images and actual character images in the specification include not only normal characters but also images, such as symbols, simple figures each formed in an image area for one character, and the like.

Preferably, the method includes the steps of:

calculating a length of the actual character images to be assumed when the actual character images are arranged in a manner immediately adjacent to each other without forming any gap therebetween; and reducing a size of each of the actual character images in a manner such that the length of the actual character images becomes equal to or smaller than a length of the predetermined image area, if the length of the actual character images is larger than the length of the predetermined image area.

Preferably, the character string image-forming device includes:

calculation means for calculating a length of the actual character images to be assumed when the actual character images are arranged in a manner immediately adjacent to each other without forming any gap therebetween;

comparison means for comparing the length of the actual character images with a length of the predetermined image area; and reduction means for reducing a size of each of the actual character images in a manner such that the length of the actual character images becomes equal to or smaller than a length of the predetermined image area, if the length of the actual character images is larger than the length of the predetermined image area.

According to these preferred embodiments, after the length of the character string of actual character images to be assumed when the actual character images are arranged in a manner adjacent to each other without forming any gap therebetween is compared with the length of the predetermined image area by the comparison means, if the length of the character string is larger than that of the predetermined image area, each actual character image is reduced in size by the reduction means such that the length of the character string is made equal to or smaller than that of the predetermined image area. In this case, since it is only required that the length of the character string is equal to or slightly smaller than that of the predetermined image area, there is no need to reduce the length of each actual character image to a degree more than required. Therefore, the image size reduction ratio of an actual character image may be smaller than that employed by conventional methods and devices in which each actual character image and blank images associated therewith are reduced together. This prevents the reduced actual character images from spoiling excellent appearance of a character string image formed thereby.

Preferably, the step of arranging the actual character images includes arranging the actual character images in the predetermined image area in a manner such that B=2D holds, where D represents a width of a blank space between an outermost one of the actual character images arranged in the predetermined image area and a corresponding side edge of the predetermined image area, and B represents a width of a blank space between each pair of adjacent ones of the actual character images.

Preferably, the arrangement means includes means for arranging the actual character images in the predetermined image area in a manner such that B=2D holds, where D represents a width of a blank space between an outermost one of the actual character images arranged in the predetermined image area and a corresponding side edge of the predetermined image area, and B represents a width of a blank space between each pair of adjacent ones of the actual character images.

According to these preferred embodiments, the plurality of actual character images are arranged in the predetermined image area such that the equation B=2D holds between the width D of the blank space between an outermost one of the actual character images arranged in the predetermined image area and a corresponding side edge of the predetermined image area, and the width B of a blank space between each pair of adjacent ones of the actual character images, whereby it is possible to form a character string image in a well-balanced layout in the predetermined image area. Further, even when each actual character image has a different character width, it is possible to prevent the length of character string image from being made unbalanced.

Preferably, the method includes the steps of:

calculating a length of the actual character images to be assumed when the actual character images are arranged in a manner immediately adjacent to each other without forming any gap therebetween; and comparing the length of the actual character images with a length of the predetermined image area, and the step of arranging the actual character images includes placing opposed end portions of adjacent ones of the actual character images in an overlapping manner such that the length of the actual character images becomes equal to or smaller than the length of the predetermined image area, if the length of the actual character images is larger than the length of the predetermined image area.

Preferably, the character string image-forming device includes:

calculation means for calculating a length of the actual character images to be assumed when the actual character images are arranged in a manner immediately adjacent to each other without forming any gap therebetween; and comparison means for comparing the length of the actual character images with a length of the predetermined image area; and the arrangement means includes means for placing opposed end portions of adjacent ones of the actual character images in an overlapping manner such that the length of the actual character images becomes equal to or smaller than the length of the predetermined image area, if the length of the actual character images is larger than the length of the predetermined image area.

According to these preferred embodiments, if the comparison of the length of actual character images arranged in a manner adjacent to each other without forming any gap therebetween with the length of the predetermined image area by the comparison means shows that the length of the character string is larger than that of the predetermined image area, the arrangement means arranges each adjacent pair of actual character images in an overlapping manner by placing opposed end portions of the adjacent pair of actual character images one upon another such that the length of the character string becomes equal to or smaller than that of the predetermined image area. For instance, assuming that the number of characters is represented by n and the width of an overlapping end of each actual character image is represented by d, if the length of the string of actual character images is larger than the length of the predetermined image area by approximately (n−1)×d, a character string image can be formed in the predetermined image area without reducing each actual character image by arranging the actual character images adjacent to each other such that end portions thereof are placed in an overlapping manner, i.e. one upon the other, as described above.

Preferably, a width of an overlapping portion of the opposed end portions of the adjacent ones is equal to or smaller than a width of each character-forming line of the actual character images.

According to these preferred embodiments, the actual character images are arranged by the arrangement means such that the width of the overlapping portion of the opposed ends of the actual character images is equal to or smaller than the line width of the actual character image, whereby a character string image formed by the actual character images adjacent to each other having end portions thereof placed one upon another is prevented from being degraded in appearance.

For instance, the plurality of character images may be two character images, and the predetermined image area is an image area for one character.

Also, the plurality of character images may be three character images, and the predetermined image area is an image area for one character.

To attain the second object, according to a third aspect of the invention, there is provided a method of processing a character string image, comprising the steps of:

taking out actual character images from a plurality of character images, respectively, the character images each occupying an area for one character and being formed of an actual character image and blank images arranged on horizontally opposite sides of the actual character image in a manner immediately adjacent thereto;

arranging the thus taken-out actual character images in a predetermined image area according to a desired sequence, to thereby form a character string image; and handling the thus formed character string image as an equivalent to an image of one character.

To attain the second object, according to a fourth aspect of the invention, there is provided a character string image-processing device comprising:

storage means for storing image data items of the respective character images;

reading means for reading out actual character image data items representative of actual character images from the respective image data items;

arrangement means for arranging actual character images corresponding to the thus read-out actual character image data items in a desired sequence in the predetermined image area to thereby form a character string image; and handling means for handling the thus formed character string image as an equivalent to an image of one character.

According to the character string image-processing method and device, a character string image is handled as an image of one character, whereby it is possible, for instance, to rotate the whole character string image similarly to rotation of a character image. That is, when the character string image formed as described above is included in a horizontal writing text, if the text is required to be displayed or printed in vertical writing, the character string image in the text is rotated similarly to the image of one character through 90 degrees without changing the formed character string image arrangement, which enables the horizontal writing text to be displayed in vertical writing without causing the user to feel a sense of disorder.

The above and other objects, features, and advantages of the invention will become more apparent from the following detailed description taken in conjunction with the accompanying drawings.

BRIEF DESCRIPTION OF THE DRAWINGS

FIG. 6 is a plan view of a compartment of the stamp making apparatus with a lid removed therefrom, and component parts associated with the compartment;

FIGS. 7A and 7B are diagrams which are useful in explaining construction of a stamp body in relation to a state mounted in the compartment;

FIGS. 8A to 8G are diagrams showing patterns for discriminating stamp bodies of various stamps;

FIG. 9 is a side sectional view which is useful in explaining operations of a stamp-detecting block for detecting a stamp body;

FIG. 10 is a plan view showing the compartment, the stamp-detecting block, and component parts associated therewith;

FIGS. 14A and 14B are diagrams showing examples of stamp images, in which:

FIG. 14A shows a case where stamp characters are entered by a normal stamp character entry mode; and FIG. 14B shows a case where character string images of "24" and "247" are formed by the character string image-forming method according to the invention;

FIGS. 15A and 15B show screen images displayed when a character string image comprised of two characters is formed in an image area for one character;

FIG. 16 shows a screen image displayed when a character string image comprised of three characters is formed in an image area for one character;

FIG. 36A is a diagram showing an image obtained by converting the FIG. 14B horizontal writing stamp image to vertical writing;

FIG. 36B is a diagram showing an image obtained by converting the FIG. 14B image to vertical writing with each character image of character string images "24" and "247" handled separately;

FIGS. 37A to 37C are diagrams showing a manner of forming a plurality of character images into a character string image arranged in a predetermined image area by a conventional character string image-forming method, in which:

FIG. 37A shows a screen image of a character string image of three characters formed in an image area for three characters;

FIG. 37B shows a screen image of a character string image of three characters formed in an image area for two characters; and FIG. 37C shows a screen image of a character string image of three characters formed in an image area for one character.

DETAILED DESCRIPTION

Figure 1A:
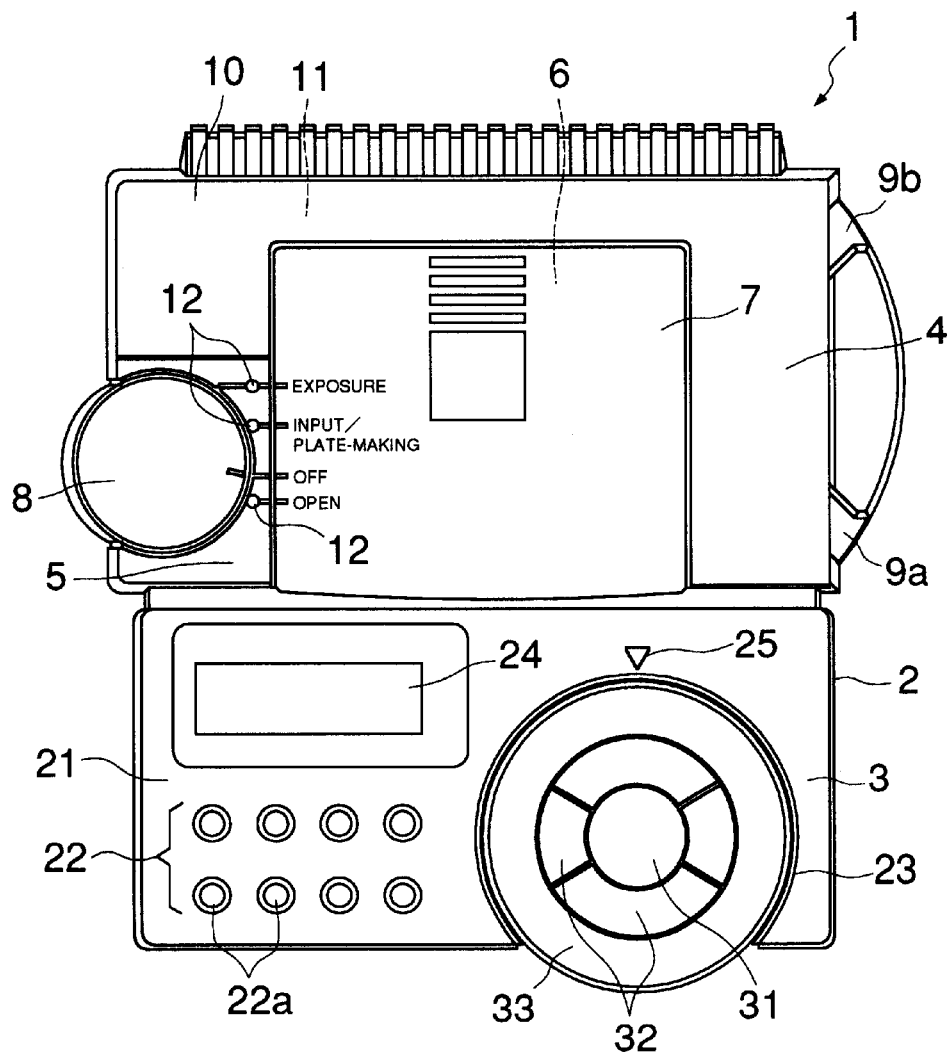
FIG. 1A is a plan view of an appearance of a stamp making apparatus to which are applied a method and a device for forming and processing a character string image, according to an embodiment of the invention.
Figure 1B:
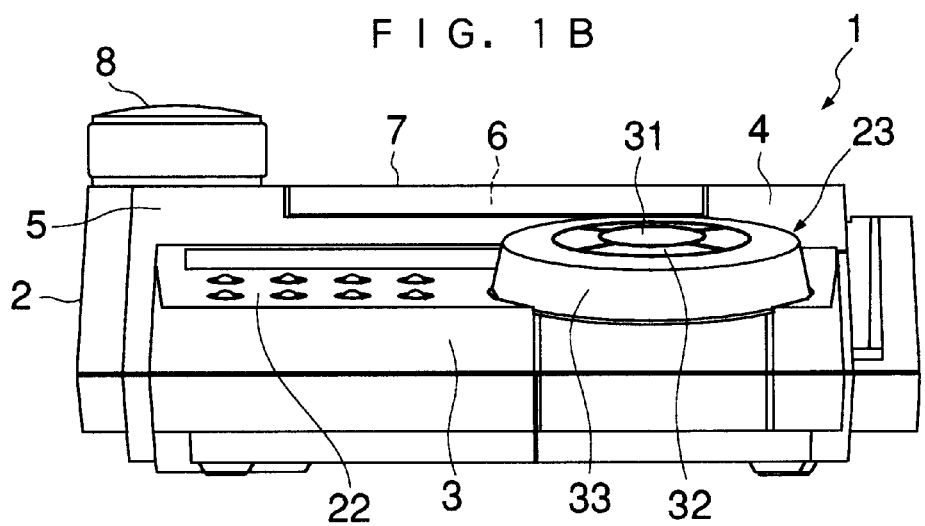
FIG. 1B is a front view of an appearance of the stamp making apparatus.
Figure 11:
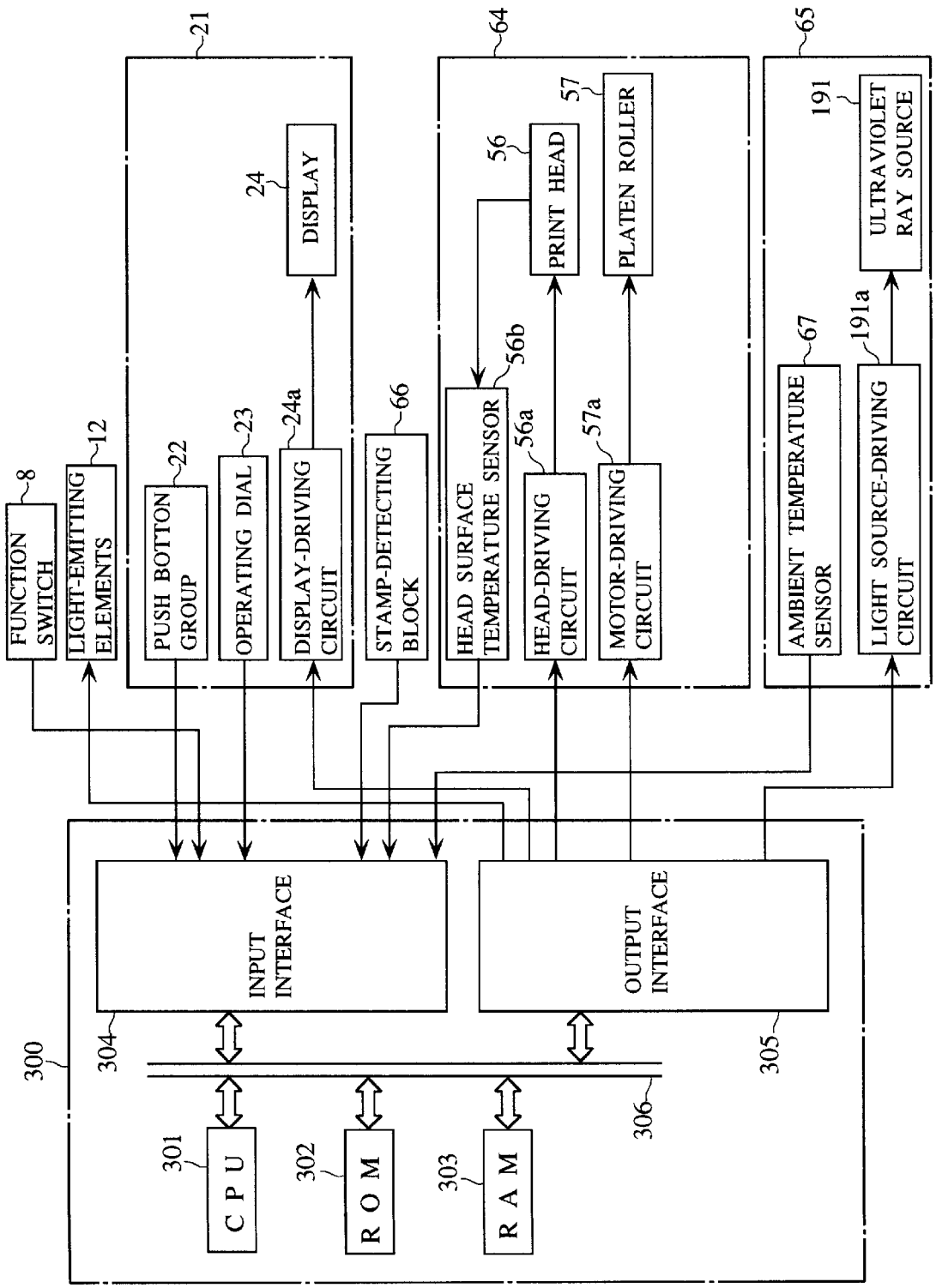
FIG. 11 is a block diagram of a control block and devices connected thereto of the stamp making apparatus.

The invention will now be described in detail with reference to drawings showing an embodiment thereof. In the embodiment, a method and a device for forming and processing character string images according to the invention is applied to a stamp making apparatus for making stamps. The stamp making apparatus makes a desired stamp by exposing a stamp body having a stamping face made of ultraviolet-curing resin to ultraviolet rays via a mask of an ink ribbon printed with a stamp image including images of characters (letters and symbols) and figures. The character string image-forming/processing method and device according to the invention are provided mainly for producing stamp image data as information for printing a mask on the ink ribbon. FIG. 1A is a plan view of the apparatus, while FIG. 1B is a front view of the same. FIG. 11 is a block diagram of a control block and devices connected thereto of the stamp-making apparatus.

Referring first to FIGS. 1A and 1B, the stamp-making apparatus 1 includes a casing 2 having upper and lower divisional portions, an electronic block 3 arranged in a front part of the casing 2, and a mechanical block 4 arranged in a rear part of the same. The mechanical block 4 is comprised of a mechanical block body 5, a compartment 6 formed in a central area of the mechanical block for receiving therein a stamp body A (see FIG. 3) as a stamp-making object material to mount the stamp body A in the mechanical block body 5, and a lid 7 for opening and closing the compartment 6, which is formed with a window. In a left side portion of the mechanical block 4 as viewed in the figures, a function switch (operating knob) 8 is provided for switching the operation of the stamp-making apparatus 1 e.g. to data entry/plate-making (printing) or exposure, as well as for operation to permit the lid 7 to be opened. Information of each switching operation of the function switch 8 is sent to an input interface 304 of a control block 300, described hereinafter, while indications of "EXPOSURE", "INPUT/ PLATE-MAKING", "OFF" and "OPEN" are provided at respective operating positions. At the operating positions of "EXPOSURE", "INPUT/PLATE-MAKING", and "OPEN", there are provided respective light-emitting elements 12 connected to an output interface 305 of the control block 300. Further, in a right side portion of the mechanical block 4, there are formed an inserting slot 9a for feeding a plate-making sheet B from which is made a stamp character label, referred to hereinafter, and a take-out slot 9b for taking out the plate-making sheet B therefrom. Further, the mechanical block 4 has a maintenance cover 10 removably mounted on part thereof around the compartment 6, and an ink ribbon cartridge 11 carrying an ink ribbon C is mounted under the maintenance cover 10 (see FIG. 2).

The electronic block 3 has an operating block 21 arranged in a top thereof and contains the control block 300 therein. The operating block 21 includes a push button group 22 and an operating dial 23 both connected to the input interface 304 of the control block 300, and a display-driving circuit 24a (not shown in FIGS. 1A or 1B) connected to the output interface 305 of the control block 300 and an display 24 driven by the display-driving circuit 24a. The operating dial 23 has a trial structure of an execution key 31 having a circular shape and arranged in the center, a cursor/ conversion key 32 having four divisional blocks arranged along the outer periphery of the execution key 31 to form an annular shape, and a character entry key 33 having an annular shape and arranged along the outer periphery of the cursor/conversion key 32. On the surface of the character entry key 33, the alphabet, numerical characters, and symbols (as well as hirakana characters representative of the Japanese syllabary in the case of a type of the apparatus which is capable of inputting Japanese language characters), neither of which is shown, are printed. The inputting of stamp characters is carried out by first setting an entry mode defining a character size and the like by pushing a predetermined button 22a of the push button group 22, turning the character entry key 33 to set each desired character to an inverted delta symbol 25, and pushing the execution key 31 (in the case of inputting Japanese language characters, after entering a desired number of hirakana characters, desired ones of the input hirakana characters are converted to kanji characters by operating the cursor/conversion key 32). When desired stamp characters are formed on the display 24, they are settled or finally set as entered characters.

Figure 2:
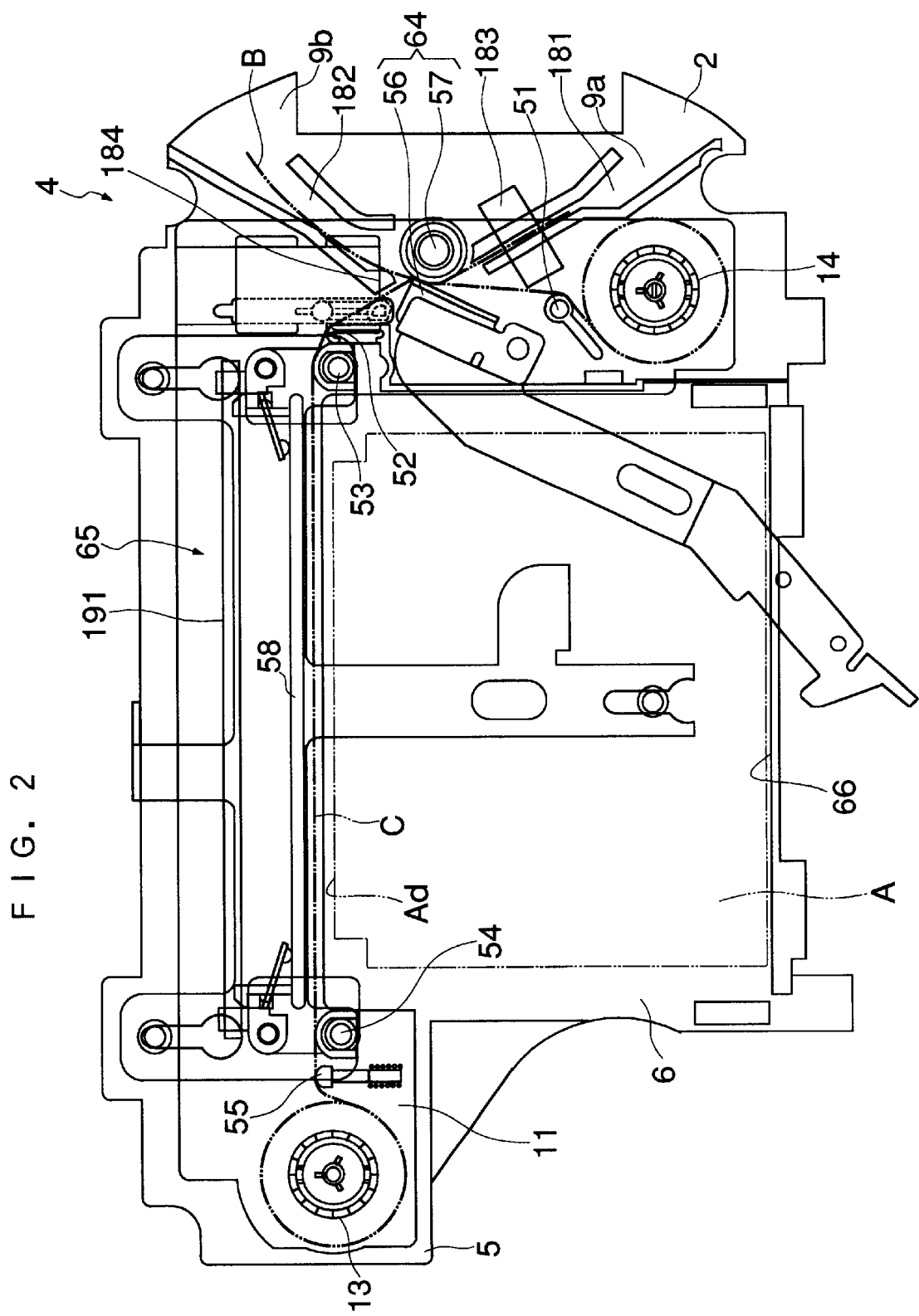
FIG. 2 is a plan view of an internal construction of a mechanical block of the stamp making apparatus.

Now, a sequence of operations for making a stamp will be briefly described with reference to FIGS. 1A, 1B and 2. First, the function switch 8 is rotated from an "OFF" position as a standby position to an "OPEN" position to open the lid 7, and a stamp body A is set in the compartment 6. As the stamp body A is set, the type of the stamp body A is detected by a stamp-detecting block 66 connected to the input interface 304 of the control block 300.

Then, the function switch 8 is rotated to the "INPUT/ PLATE-MAKING" position to shift the function of the apparatus to data entry/plate-making, and the push button group 22 and the operating dial 23 are operated to input stamp characters. When the inputting of stamp characters is completed, the plate-making sheet B on which a stamp character label is provided is set by inserting the same into the inserting slot 9a.

Then, the predetermined button 22a of the push button group 22 is operated to cause the apparatus to execute the plate-making operation (plate-making process), i.e. printing of the stamp characters. The printing is effected simultaneously on the ink ribbon C and the plate-making sheet B and portions of ink coated on the ink ribbon, which define characters, are transferred to the plate-making sheet B. When the printing is completed, the printed portion of the ink ribbon C is fed or advanced to set the same for exposure to ultraviolet rays, and at the same time the plate-making sheet B is discharged from the take-out slot 9b. When it is confirmed by the plate-making sheet B discharged that there is no error in the printed stamp characters, the function switch 8 is rotated to the "EXPOSURE" position to shift the function of the apparatus to exposure, thereby causing the apparatus to perform exposure of the stamp body to ultraviolet rays.

When the exposure to ultraviolet rays is completed, the function switch 8 is rotated to the "OPEN" position to open the lid 7, and then the stamp body A is removed from the compartment 6 to wash the same. The washing completes the stamp. Before or after completion of the stamp, the stamp character label is peeled off the plate-making sheet B to affix the same to the back of the stamp.

Next, out of the component parts and elements of the stamp-making apparatus 1, ones associated with the control block 300, described in detail hereinafter, will be described with reference to FIGS. 2 to 10, one by one.

The ribbon cartridge 11 is constructed such that it is removable from the mechanical block body 5, and it is replaceable together with a casing thereof when the ink ribbon C is used up. As shown in FIG. 2, the ribbon cartridge 11 has a take-up reel 13 arranged at one end thereof and a supply reel 14 arranged at the other end thereof. The ink ribbon C is rolled out from the supply reel 14, fed along an L-shaped feed path as viewed in FIG. 2, and taken up by the take-up reel 13. The L-shaped feed path has a shorter side portion which a printing block 64, referred to hereinafter, faces and a longer side portion which the exposure block 65 faces. The printing block 64 faces the ink ribbon C and the plate-making sheet B simultaneously, and the exposure block 65 faces the ink ribbon C printed with the image of the stamp characters.

The ink ribbon C is comprised of a transparent ribbon tape and ink coated thereon. In the present embodiment, it has a thickness of 6 $\mu$m. When the printing block 64 of the apparatus carries out printing on the ink ribbon C, a portion of ink coated on the ink ribbon, which defines a character, is transferred to the plate-making sheet B, whereby the ribbon tape of the ink ribbon C is formed with a negative image by a transparent portion from which the portion of ink defining the character has been transferred, while the plate-making sheet B is formed with a positive image by the transferred portion of ink defining the character. The printed portion of the ink ribbon C is sent forward to the exposure block 65, where the negative image-formed portion thereof is used as a mask in carrying out the exposure, while the plate-making sheet B is delivered from the apparatus for the user to confirm the stamp characters and affix part (stamp character label) of the plate-making sheet B to the stamp thus made.

Figure 4:
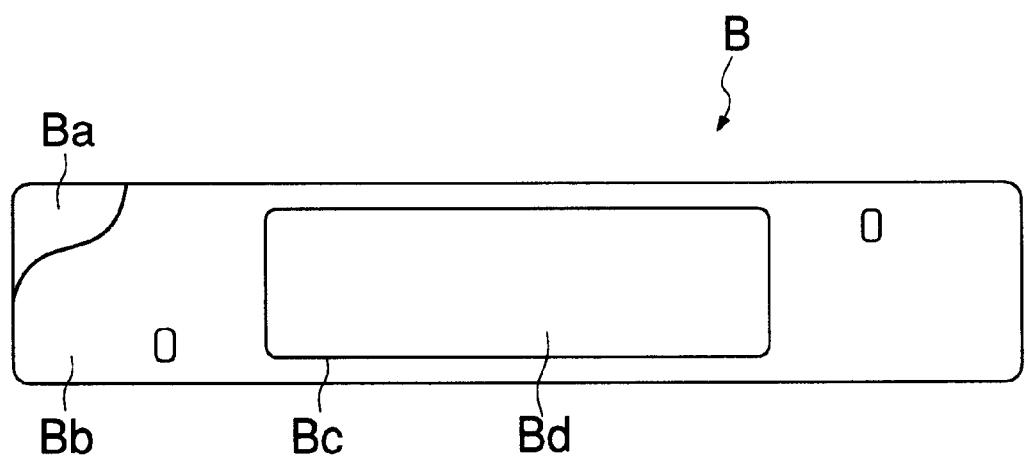
FIG. 4 is a view showing a structure of a plate-making sheet.

As shown in FIG. 4, the plate-making sheet B is formed of a laminate of a base sheet Ba and an adhesive sheet Bb, generally in the form of a strip. The adhesive sheet Bb is formed with cutting lines Bc defining a rectangular area. The rectangular area of the adhesive sheet Bb is peeled off the base sheet Ba along the cutting lines Bc to form the stamp character label Bd to be affixed to the back of the stamp. There are provided several types of the stamp body A which are different in shape from each other according to the use of stamps, and there are also provided respective corresponding types of the plate-making sheet which are different in the shape of an area of the stamp character label Bd (shape and size of an area defined by cutting lines).

Figure 3:
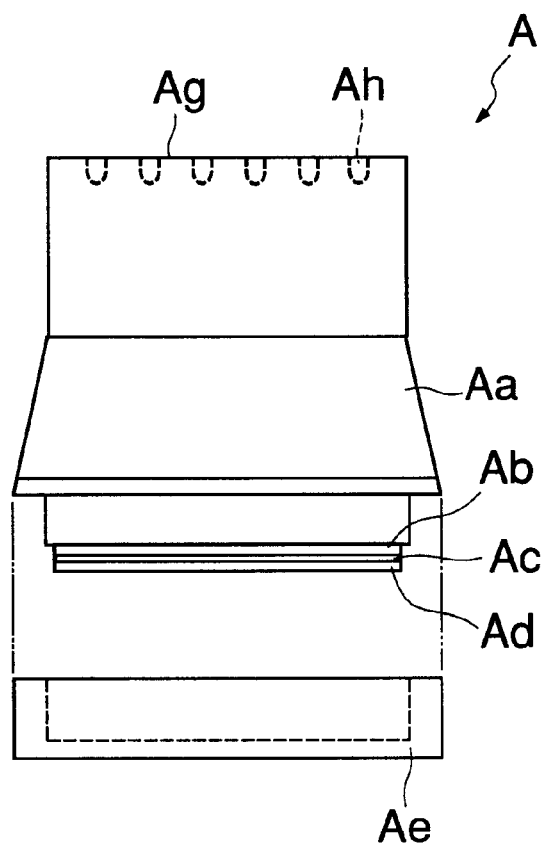
FIG. 3 is a plan view of a stamp body.

On the other hand, as shown in FIG. 3, the stamp body A is comprised of a stock Aa formed of a resin or the like, a thin sponge Ab (foamed urethane) affixed to a front end of the stock Aa, an ultraviolet-insensitive resin base Ac affixed to the sponge Ab, and an ultraviolet-curing resin affixed to the resin base Ac to form a stamping face Ad. The ultraviolet-curing resin portion (stamping face Ad) of the stamp body A is exposed to ultraviolet rays by using the ink ribbon C as a mask, whereby portions of the stamping face Ad corresponding to the stamp characters are cured. In this state, the stamp body A is taken out of the compartment 6, and washed with water to remove uncured portions of the stamping face, which are soluble in water, from the stamping face Ad. Thus the stamp is completed. A symbol Ae in the figure designates a cap made of resin.

Next, the printing block 64 will be described with reference to FIGS. 2 and 11. The printing block 64 includes a head-driving circuit 56a and a motor-driving circuit 57a both of which are connected to the output interface 305 of the control block 300, a print head (thermal head) 56 driven by the head-driving circuit 56a for printing stamp characters on the ink ribbon C, a platen roller 57 driven by the motor-driving circuit 57a for feeding the ink ribbon C in a manner timed to printing operations of the print head 56, and a head temperature sensor 56b arranged on a head surface of the print head 56. Further, the casing 2 is formed with a feeding passage 181 through which the plate-making sheet B is fed to a contacting area between the print head 56 and the platen roller 57 and a delivery passage 182 through which the plate-making sheet B is delivered. The feeding passage 181 has an upstream end thereof formed with the inserting slot 9a which is open to the outside of the apparatus, and the delivery passage 182 has a downstream end thereof formed with the take-out slot 9b which is open to the outside of the apparatus.

The platen roller 57 is a drive roller as described above, and when the ink ribbon C is rolled out from the supply reel 14, it pulls in the plate-making sheet B between the same and the print head 56 to thereby bring a portion of the ink ribbon C and a portion of the plate-making sheet B, one upon the other, onto the print head 56. The print head 56 is a thermal head, and thermally transfer ink coated on the ribbon tape of the ink ribbon C to the plate-making sheet B. This transfer of the ink peels portions of ink corresponding to stamp characters off the ink ribbon C to reveal corresponding portions of the transparent base of the ribbon tape, while the peeled portions of the ink are attached to the plate-making sheet B as the stamp characters. The head surface temperature sensor 56b is formed by a temperature sensor, such as a thermistor, arranged on a surface of the print head 56 in an intimately contacting manner, and connected to the input interface 304 of the control block 300, for sending information of a temperature of the print head 56 detected thereby.

On the feeding passage 181 faces a sensor 183 which detects insertion of the plate-making sheet B and a feeding reference position of the same. The plate-making sheet B inserted into the feeding passage 181 is sent forward by the platen roller 57 depending on results of the detection of the sensor 183 whereby printing is started from one end of the stamp character label Bd. One of walls defining the delivery passage 182 on a left-hand side as viewed in FIG. 2 is formed with a separating nail 184 at an upstream end thereof, whereby the ink ribbon C and the plate-making sheet B being fed, one upon the other, are separated from each other. Thereafter, the ink ribbon C is sent forward to the exposure block, while the plate-making sheet B is delivered via the delivery passage 182 out of the apparatus.

Next, the exposure block 65 provided will be described with reference to FIGS. 2 and 11. The exposure block 65 includes a light source-driving circuit 191a connected to the output interface 305 of the control block 300, an ultraviolet ray source 191 arranged in a manner opposed to the stamping face Ad of the stamp body A set in the compartment 6 and driven by the light source-driving circuit 191a, and a presser plate 58 arranged between the ultraviolet ray source 191 and the stamping face Ad of the stamp body A. The ultraviolet ray source 191 is a self-heating hot-cathode tube called a semi-hot tube and supported on a fluorescent tube holder, not shown, provided on a base plate, not shown. The stamping face Ad of the stamp body A, the presser plate 58, and the ultraviolet ray source 191 are arranged in a manner parallel to each other with a gap between adjacent ones thereof. The ink ribbon C is fed between the stamping face Ad and the presser plate 58.

The presser plate 58 is formed e.g. of a transparent resin, and moves forward (downward as viewed in FIG. 2) to urge the ink ribbon C against the stamping face Ad of the stamp body A. More specifically, the exposure is carried out by causing the presser plate 58 to urge the ink ribbon C against the stamping face Ad of the stamp body A, and lighting the ultraviolet ray source 191 to thereby irradiate light to the ink ribbon C through the presser plate 58 (see FIG. 5). The exposure block 65 is provided with an ambient temperature sensor 67 which is formed by a thermistor as the like and connected to the input interface 304 of the control block 300, and sends information of a temperature of ambience of the exposure block 65 detected thereby to the input interface 304.

It should be noted that as the presser plate 58 is translated forward, the first guide pin 53 and the second guide pin 54 are moved in the same direction. This movement decreases the tension of the ink ribbon C stretched between the first and second guide pins 53, 54, whereby the ink ribbon C is urged against the stamping face Ad of the stamp body A with reduced tension, i.e. without forming any vertical wrinkles thereon.

Now, the above-mentioned state of the ink ribbon C is described in further detail with reference to FIGS. 2 and 5. Referring to FIG. 2, when the ink ribbon C is fed or advanced, the pulling force of the take-up reel 13 causes strong tension of the ink ribbon C, so that vertical wrinkles are formed on the ink ribbon C due to its very small thickness. Therefore, if the ink ribbon C is urged against the stamping face Ad of the stamp body A as it is, there remain the wrinkles formed on the ink ribbon C urged against the stamping face Ad, so that deformed images (negative) of the stamp characters on the ink ribbon C are used in carrying out the exposure of the stamping face Ad to the ultraviolet rays. On the other hand, if the ink ribbon C is loosened, the exposure can be carried out with the images of the stamp characters being out of position. To eliminate these inconveniences, as shown in FIG. 5, the first guide pin 53 and the second guide pin 54 are moved forward in accordance with the forward movement of the presser plate 58, whereby the tension of the ink ribbon C is reduced, and at the same time, a slight stretching force is applied to the ink ribbon C by the tension pin 55, which is moderate enough not to produce any wrinkles on the ink ribbon C.

Figure 5:
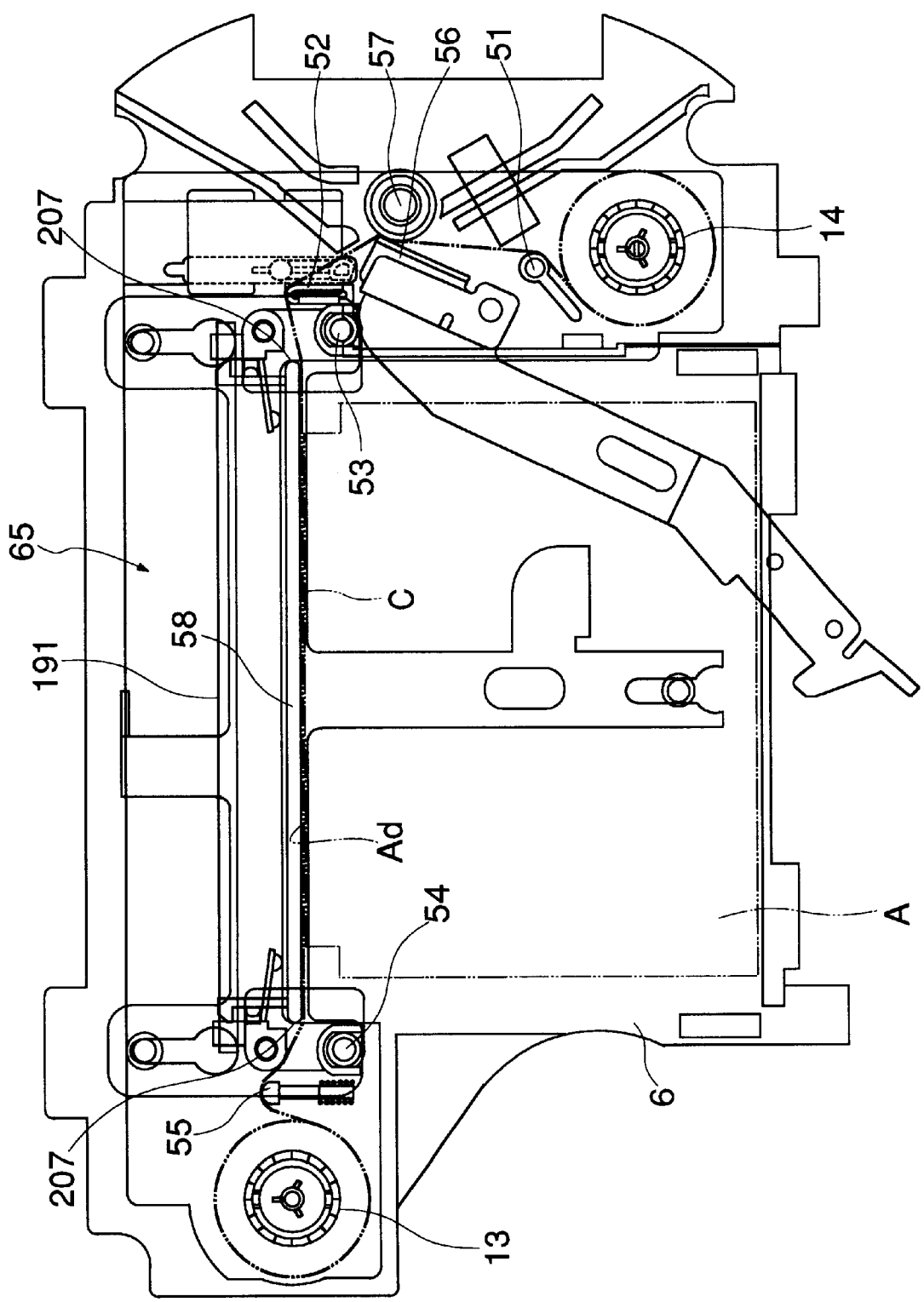
FIG. 5 is a plan view of an exposure system of the mechanical block and component parts associated therewith.

Further, the ink ribbon C in the exposure position shown in FIG. 5 is bent backward at the longitudinal opposite ends of the presser plate 58 by the tension pin 55 and the second path-setting pin 52, and the chamfered portions 207 formed at the longitudinal opposite ends of the presser plate 58 operate to prevent undesired wrinkles from being produced on the ink ribbon C.

As described above, a positive image on the plate-making sheet B and a negative image on the ink ribbon C both formed by the printing are used as a stamp character label and an exposure mask, respectively. That is, the quality of these images directly reflects on the quality of a stamp as a final product. Especially, when the ink ribbon C, which is used as the exposure mask, is deformed, images of deformed characters are formed on the stamp body by the exposure. To eliminate this inconvenience, in addition to mechanical structural means for regulating the tension of the ink ribbon described above, electrical means of adjusting an amount of heat generated by the exposure process, described hereinafter, is provided to thereby prevent undesired wrinkles from being formed on the ink ribbon C.

Next, the stamp-detecting block 66, the operation of which is linked to the opening and closing of the lid 7, will be described. The stamp-detecting block 66 detects the mounting of the stamp body A in the compartment 6, and at the same time discriminates the type of the mounted stamp body A. The stamp body A includes various types having respective different shapes, e.g. ones for a square stamp, a personal name stamp, a business stamp, an address stamp, etc. The different types of stamp bodies A for respective types of stamps are identical in length, but different in width and thickness. To set each of these various types of the stamp body A different in width and thickness to a fixed position with respect to the directions along the width and the thickness of the stamp body A, in the present embodiment, as shown in FIGS. 6 and 7A to 7D, four bosses 251, 251, 251, 251, long and short, are provided on the bottom 6b of the compartment 6 such that they extend perpendicularly upward from the bottom, and the stamp body A is formed with fitting holes Af for fitting corresponding ones of the bosses therein, respectively (see FIGS. 7A and 7B)

The four bosses 251, 251, 251, 251 are arranged to form a T shape, and in a manner corresponding thereto, a stamp body A for the square stamp, for example, is formed with two fitting holes Af, Af (see FIG. 7A), and a stamp body A for the business stamp, for example, is formed with four fitting holes Af, Af, Af, Af (see FIG. 7B). The number of the fitting holes Af and the depth of each of them depend on the type of the stamp body A, and this combination of the fitting holes Ag and the bosses 251 enables each stamp body A to be mounted in the compartment 6 such that the center of the stamping face Ad of the stamp body A mounted in the compartment 6 is positioned to a fixed location.

Further, the back surface Ag on the opposite side to the stamping face Ad is formed with a plurality of small holes Ah (type-detecting holes) arranged side by side at respective central locations along the width of the stamp body A. The small holes Ah cooperate with a switch array 262 of the stamp-detecting block 66, described hereinafter, to detect the type of the stamp body A (see FIGS. 8A to 8G). The stamp character label Bd of the plate-making sheet B printed with stamp characters and delivered to the outside of the apparatus separately from the ink ribbon C is affixed to the back surface Ag of the stamp body A, whereby the small holes Ah are concealed.

As shown in FIGS. 9 and 10, the stamp-detecting block 66 includes a switch holder 261 (also serving as a wall of the compartment 6) arranged such that it is opposed to the back surface Ag of the stamp body A when it is mounted in the compartment 6, and the switch array 262 formed of six detecting switches 263 supported on the switch holder 261. Each detecting switch 263 is comprised of a switch body 264 formed e.g. of a push switch, and a switch top 265 having one end for being projected into the compartment 6. The switch top 265 includes a plate portion 266 and a detecting projection 267 (including the one end) extending at a right angle to the plate portion 266, with a lower part of the plate portion 266 being guided by a guide projection 268 formed in the switch holder 261 and the detecting projection 267 being guided by a guide hole 269 formed through the switch holder 261 for forward and backward motions thereof.

The switch body 264 is fixed to the reverse side surface of a base plate 270 such that a plunger 271 thereof abuts the plate portion 266 of the switch top 265. In this embodiment, the plunger 271 urges the switch top 265 toward the compartment 6 by the urging force generated by its spring, not shown. A state of the one end of the detecting projection 267 projected into the compartment 6 via the guide hole 269 through the switch holder 261, and a state of the same being retracted against the urging force of the plunger 271 correspond to ON-OFF states of the detecting switch 263, respectively. Actually, when any of the detecting switches 263 of the switch array 262 is turned on, that is, when the one end of the detecting projection 267 is retracted into the guide hole 269, mounting of the stamp body A is detected, whereas when all of the detecting switches 263 are turned off, that is, when the one end of the detecting projection 267 is projected into the compartment 6, removal of the stamp body A is detected. The detecting switches 263 of the switch array 262 are each in ON or OFF state depending on whether a corresponding small hole Ah exists in the stamp body A. Therefore, the type of the stamp body A can be determined from a pattern of ON/OFF states of the six detecting switches 263.

FIGS. 8A to 8G show the relationship between small holes Ah in the stamp body A and the six detecting switches 263 (detecting projections 267). Provision of the six detecting switches 263 for detecting presence or absence of the small holes Ah makes it possible to detect $2^6-1$, i.e. 63 types of patterns. A stamp body A for a square stamp or the like, which is small in width, has no small holes Ah corresponding to two outermost detecting switches 263, 263 on respective opposite sides, and the two detecting switches 263, 263 project into space at opposite locations outside the stamp body A. That is, a stamp body A having a small width, such as a stamp body A for a square stamp, is recognized by a pattern for a stamp body A having imaginary small holes Ah at outermost locations thereof.

Next, the control block 300 will be described with reference to FIG. 11. The control block 300 is formed e.g. by a microcomputer, and includes a CPU 301, a ROM 302, the input interface 304, the output interface 305, and a system bus 306 connecting all these devices to each other.

The ROM 302 stores various programs, fixed data, such as font data of characters, symbols, etc. (as well as dictionary data for kana-kanji character conversion in the case of the type of the apparatus adapted to the entry of Japanese language characters). The RAM 303 is used as a working area, and also as means for storing fixed data input by the user. The data stored in the RAM 303 is backed-up even when the power is turned off.

The input interface 304 serves as an interface for taking in signals from the function switch 8, the push button group 22 and the operating dial 23 of the operating block 21, the head surface temperature sensor 56b and an optical sensor 183, referred to hereinafter, of the printing block 64, the ambient temperature sensor 67 of the exposure block 65, and the stamp-detecting block 66, via the system bus 306 into the CPU 301 or the RAM. On the other hand, the output interface 305 works as an interface for delivering control signals and data for use in control operations, which are received via the system bus 306 from the CPU 301, the ROM 302, and the RAM 303, to the light-emitting elements 12, the display-driving circuit 24a of the operating block 21, the head-driving circuit 56a of the printing block 64, the motor-driving circuit 57a, the light source-driving circuit 191a of the exposure block 65, etc.

The CPU 301 is capable of performing multitask processing. It carries out processing based on input signals from the input interface 304, and a processing program stored within the ROM 302 and selected according to the processing on each occasion, using the RAM 303 as the working area, and fixed data stored within the ROM 302 and the RAM 303, as required.

Figure 12:
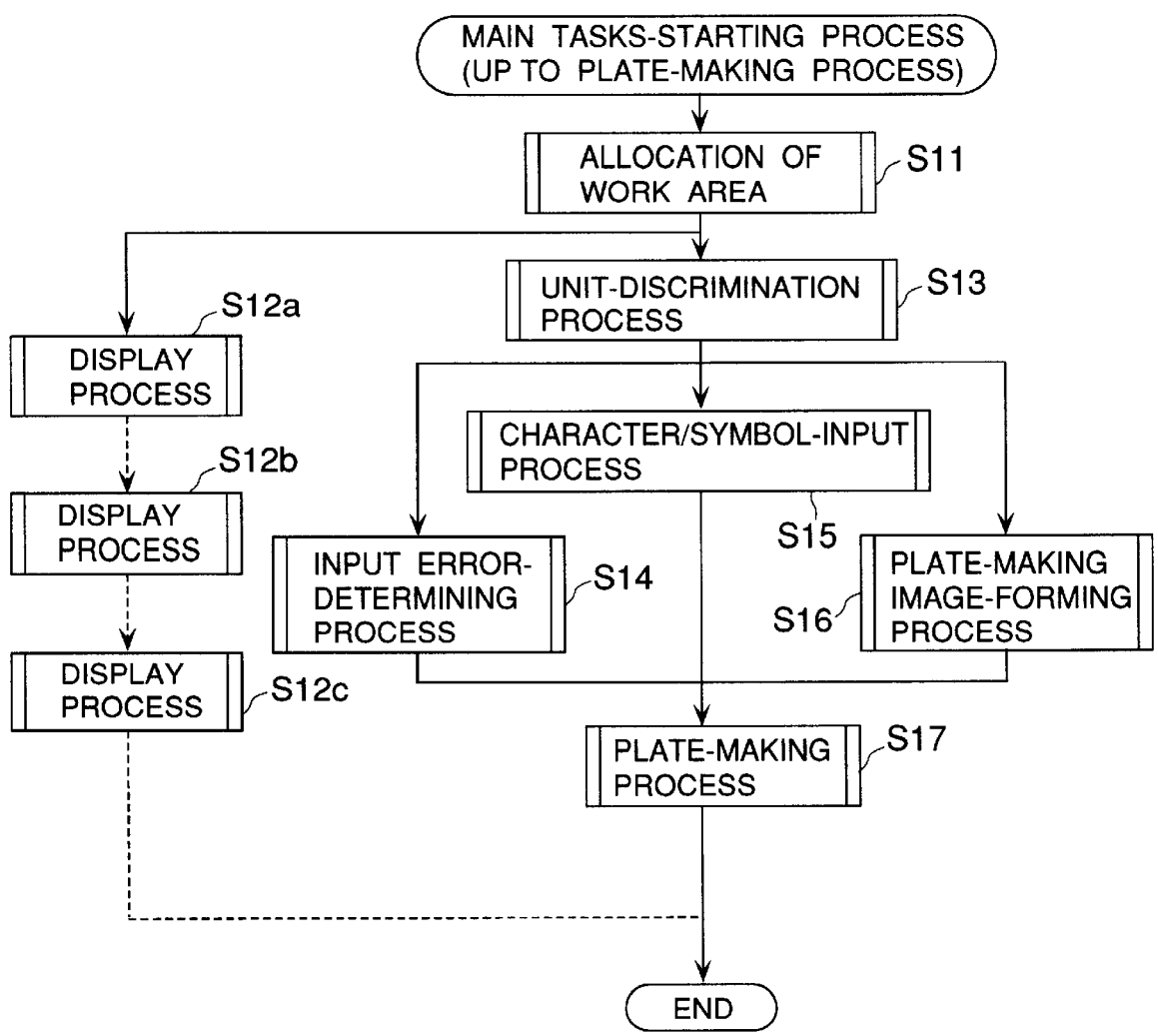
FIG. 12 is a flowchart of an example of main tasks-starting process executed by the stamp making apparatus.

FIG. 12 shows an example of a main tasks-starting process (a flowchart showing a subroutine for carrying out the main tasks-starting process up to the plate-making process). As shown in the figure, after a task of the main tasks-starting process is activated, first, a work area is allocated at step S11, and then each task of display processes is activated at steps S12a, S12b and S12c and a task of unit (stamp body)-discrimination process at step S13. Then, a task of an input error-determining process is started at step S14, a task of character/symbol entry process at step S15, a task of a plate-making image (stamp image)-forming process at step S16. Tasks of the above steps (S14, S15 and S16) are simultaneously executed in parallel with each other.

More specifically, after an entry of a character (letter, symbol, figure or the like) is effected, and before the following entry of a character is effected at step S15, it is determined at step S14 whether or not there is an inconvenience in the number of characters entered, and an image for use in the plate-making is formed at step S16. In the course of executing these steps, if a character entry is carried out at step S15, the task of the input error-determining process (S14) and that of the plate-making image-forming process (S16) are immediately stopped, and then resumed from the start thereof. That is, whenever data of input characters is changed, the above steps (S14, S16) are carried out and the plate-making image is constantly renewed based on data of the newest characters before execution of a plate-making process at step S17.

It should be noted that parallel processing, such as the multitask processing described above, can be realized by a program or by employing an interrupt control circuit which controls the order of priority of interrupts generated for interrupt handling routines to execute all the tasks described above.

In the case of the stamp making apparatus 1, the character string image-forming/processing method and device according to the invention are mainly implemented by the control block 300 and the operating block 21. Features of operations executed by the stamp making apparatus 1 will be described with reference to FIGS. 11 to 36B. As described above, stamp characters on the stamping face Ad are formed by a stamp image produced on the ink ribbon C and hence the following description will be mainly made of a process of forming a stamp image on the ink ribbon C.

Figure 13:
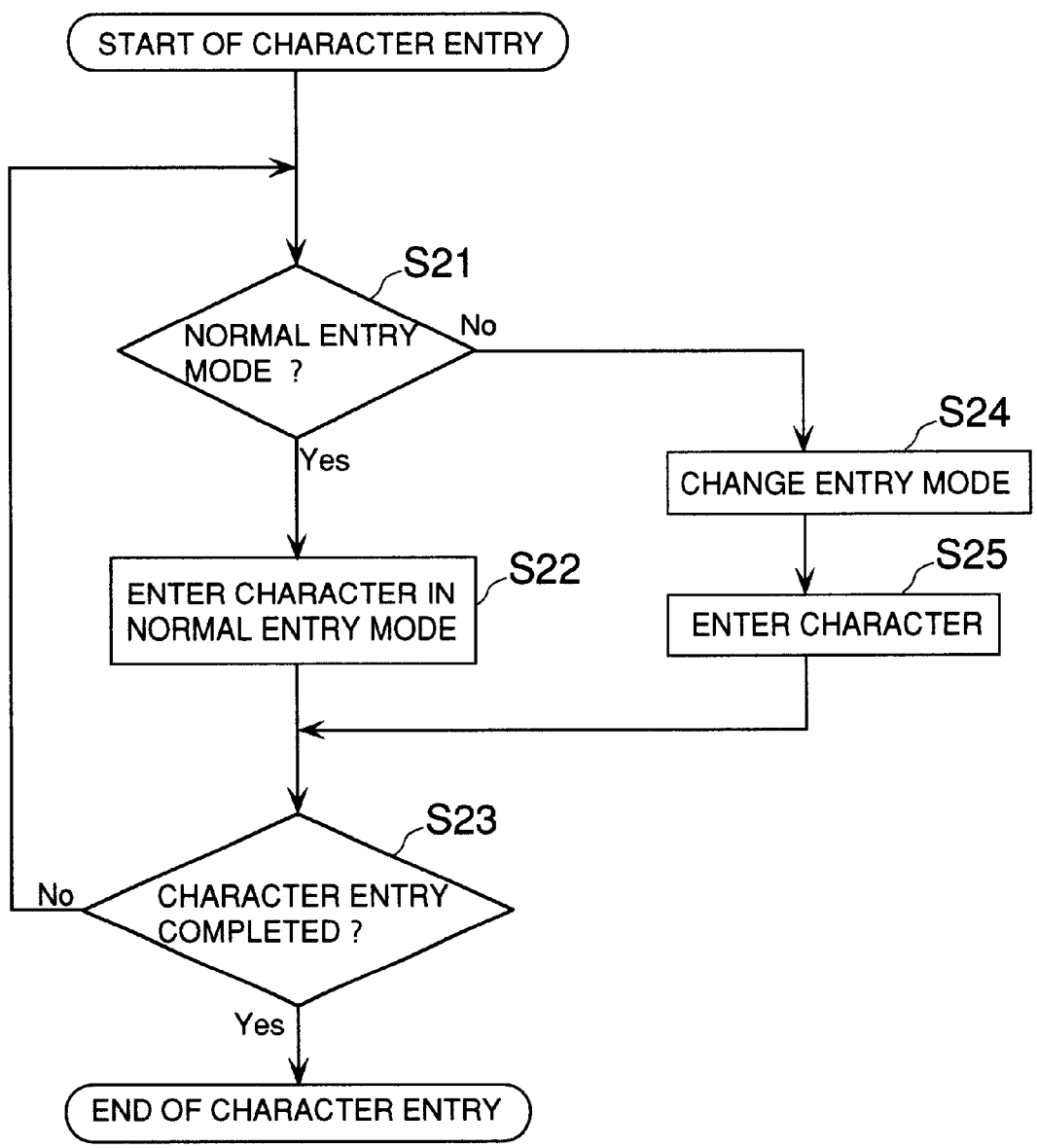
FIG. 13 is a flowchart showing a stamp character entry procedure.

FIG. 13 is a flowchart showing a subroutine for entering stamp characters. Now, description is made of a case where stamp characters e.g. of an address "1-24 -247 Kasumigaseki, Chiyoda ward" shown in FIG. 14A, are input according to the stamp character entry subroutine and the character strings of "24" and "247" are each created in an area (image area) for one character, followed by carrying out the plate-making process to form a stamp image shown in FIG. 14B.

When the power of the stamp making apparatus 1 is turned on, the apparatus is made ready for entering stamp characters in a normal entry mode. Then, the stamp characters appearing in FIG. 14A are sequentially input starting from a character at a left side end of the total character string. That is, the character entry key 33 (and the cursor/conversion key 32, if required) are operated to sequentially input characters "1-" at steps S21, S22 and S23.

Then, before entering the numerical characters "24", the button 22a and the cursor/conversion key 32 are operated to thereby change the entry mode from the "normal entry mode" to a "2-digit number entry mode" at step S24, and the numerical characters "24" are entered in this entry mode at step 25. More specifically, when the character entry key 33 is rotated for setting the numerical character "2" to the inverted delta symbol 25, a symbol "½" and a character "2" shown in FIG. 15A are displayed on the display 24. Similarly, when the numerical character "4" is set to the inverted delta symbol 25, a symbol and a character shown in FIG. 15B are displayed on the display 24. As described above, after desired characters are displayed, the entry of the characters is made definite, whereby a character string image data item representative of a character string image "24" to be formed in an area for one character is stored in the RAM 303.

After entering the numerical characters "24" in the above manner, the entry mode is once returned to the "normal entry mode" to input a symbol "-". It should be noted that the symbol "½" displayed before each of the characters "2" and "4" is only displayed on the display 24 and not formed on the ink ribbon C in the actual plate-making process.

Next, after entering the numerical characters "247", the entry mode is changed to a "3-digit number entry mode" at step S24, and the numerical characters "247" are entered in this entry mode at step S25. More specifically, when the entry mode is changed to the "3-digit number entry mode", a menu of symbols of "⅓" and numerical characters of "0", "1", "2", . . . and "9" in respective pairs, as shown in FIG. 16, is displayed on the display 24. Then, the cursor/conversion key 32 is operated to move the cursor to the numerical character "2" for selection, followed by making the entry of the characters definite. Similarly, the numerical characters "4" and "7" are sequentially selected for entry, and the entry thereof is made definite, whereby a character string image data item representative of a character string image "247" to be formed in an area for one character is stored in the RAM 303. The symbols "⅓" are not formed on the ink ribbon C in the actual plate-making process, similarly to the case of the symbol "½". Then, in the normal entry mode, the remaining stamp characters "Kasumigaseki, Chiyoda ward" are entered, followed by terminating the character entry process.

Now, a manner of creating character string image data items representative of respective character strings of the 2-digit number "24" and the 3-digit number "247" in a data-creating area of the RAM 303, which corresponds to an image area (e.g. 24 dots in the direction of the length thereof×24 dots in the direction of the width thereof) for one character, that is, a character string image-forming process will, be described in detail with reference to FIGS. 17 and 18. In the description, it is assumed that each of the above characters "2", "4" and "7" is a character image formed from a dot matrix of 24×24 dots.

Figure 17:
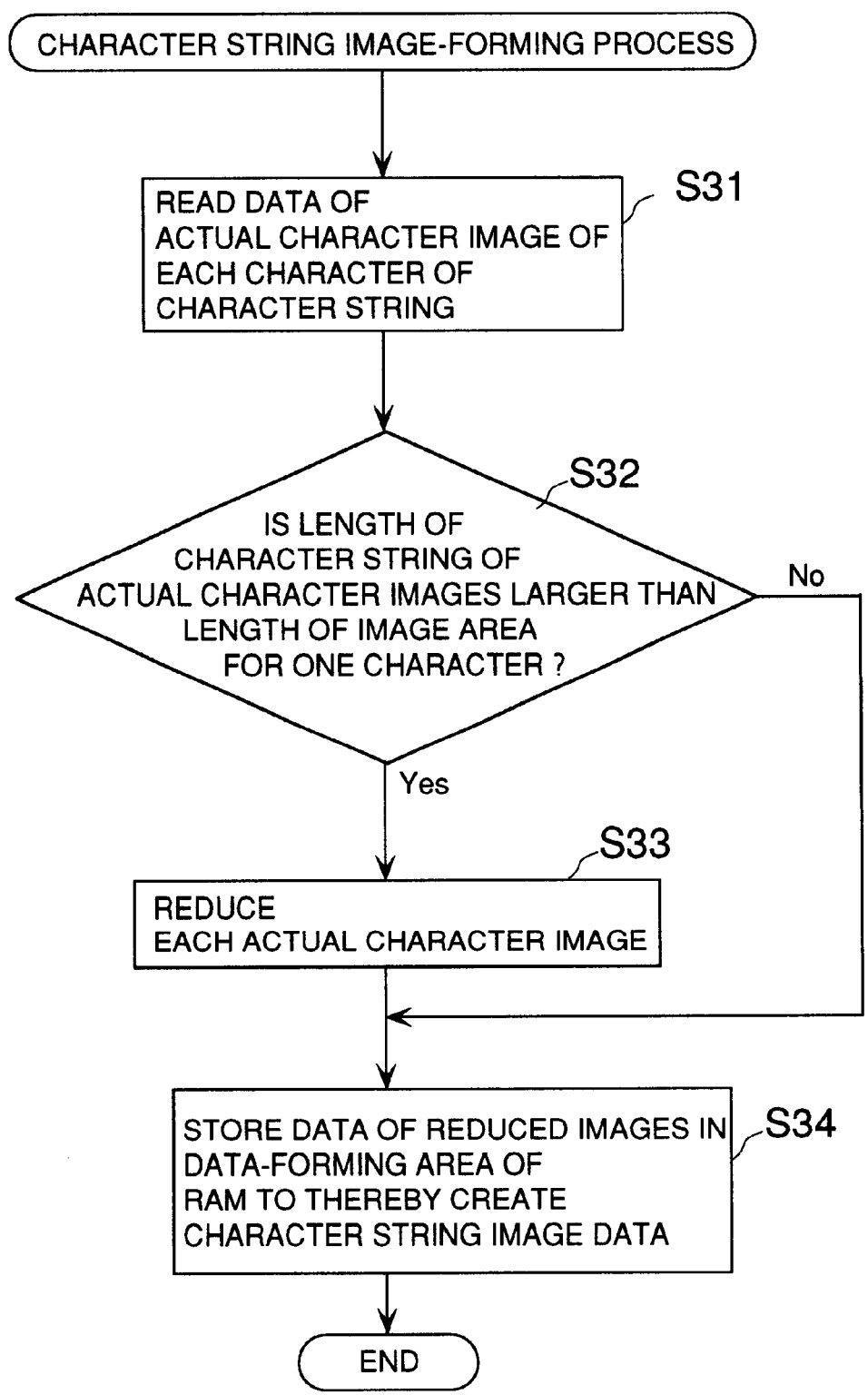
FIG. 17 is a flowchart showing a subroutine for carrying out a character string image-forming process.

FIG. 17 is a flowchart showing a subroutine for carrying out the character string image-forming process. FIG. 18 is a diagram schematically showing an image of a process in which a character string image data items is formed in the RAM 303 from image data items representative of the respective character images of "2" and "4". As shown in the figures, after the 2-digit number "24" is entered, first, data items of actual character images (actual image data items) are read out from the image data of the character images "2" and "4" stored in the ROM 302 (storage means) by the CPU 301 (reading means) at step S31 in FIG. 17 (STEP 1 in FIG. 18).

That is, in the ROM 302 are stored image data items (in Mincho typeface) of character images e.g. of "1", "2", . . . , "9" and "0", each formed by a dot matrix of 24×24 dots, as shown in FIGS. 19A to 20E and a look-up table for obtaining actual image data items. TABLE 1 shown below is an example of the actual image data look-up table. Actual image data is read out with reference to this table.

TABLE 1

ACTUAL IMAGE DATA LOOK-UP TABLE

| CHAR-ACTERS | 16 × 16(dots) | | 24 × 24(dots) | | 32 × 32(dots) | | 48 × 48(dots) | |
|---|---|---|---|---|---|---|---|---|
| | a | b | a | b | a | b | a | b |
| 1 | 4 | 10 | 4 | 16 | 6 | 20 | 10 | 31 |
| 2 | 3 | 10 | 3 | 16 | 6 | 20 | 9 | 31 |
| 3 | 3 | 10 | 3 | 16 | 7 | 20 | 10 | 31 |
| 4 | 2 | 10 | 4 | 16 | 6 | 20 | 8 | 31 |
| 5 | 3 | 10 | 4 | 16 | 6 | 20 | 9 | 31 |
| 6 | 3 | 10 | 4 | 16 | 7 | 20 | 9 | 31 |
| 7 | 3 | 10 | 4 | 16 | 6 | 20 | 10 | 31 |
| 8 | 3 | 10 | 4 | 16 | 6 | 20 | 9 | 31 |
| 9 | 3 | 10 | 4 | 16 | 6 | 20 | 9 | 31 |
| 0 | 2 | 10 | 4 | 16 | 6 | 20 | 9 | 31 |

It should be noted that values entered under the columns "a" and "b" provided for each dot matrix in the above TABLE 1 represent a dot number of a blank image on a left-hand side of each character image in FIGS. 19A to 20E d a dot number of an actual character image of each figure (each actual character image includes small blank images on horizontal opposite ends thereof), respectively. Therefore, when an actual image data item is read out, only data from an a-th column of dots from a left end side of each dot matrix to an (a+b)-th column of dots is read out.

Actual character images of the character images "2" and "4" represented by actual image data items read out in the above manner are arranged in a horizontal sequence in a manner adjacent to each other without forming a gap therebetween to form a character string, and the length of the character string (represented by the number of dots in a horizontal direction) is compared with the length of an image area for a character (represented by a dot number (24 dots) in the horizontal direction) by the CPU 301 (comparison means) to thereby determine at step S32 whether or not the length of the character string is larger than the length of the image area. In this embodiment, as shown in the TABLE 1, dot numbers of the character widths of the actual character images of the character images "2" and "4" (hereinafter, "dot number of a character width in the horizontal direction" is simply referred to as "dot number") are both set to 16 dots, and hence the length of the character string becomes equal to 32 (16+16) dots. Therefore, each actual character image is reduced by the CPU 301 (reduction means) at step S33 in FIG. 17 (STEP 2 in FIG. 18) such that the length of the character string formed thereby is made equal to or smaller than 24 dots.

Figure 21A:
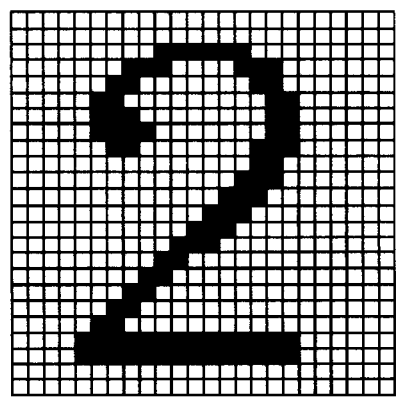
FIG. 21A is a diagram showing a dot matrix of the character image "2", which is similar to FIG. 19B.
Figure 21B:
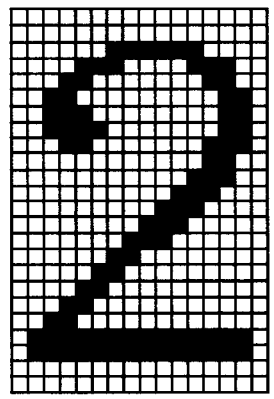
FIG. 21B is a diagram showing a dot matrix of an actual character image of the character image "2"
Figure 21C:
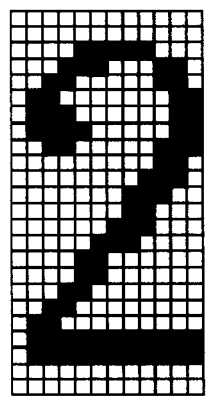
FIG. 21C is a diagram showing a dot matrix of the actual character image of the character image "2" reduced in size to 75% thereof.

In the above process, in order that each actual character image having a dot number of 16 dots, such as "2" and "4", is decreased in size and arranged in a horizontal sequence in a manner adjacent to each other such that the dot number of the length of the resulting character string is made equal to or smaller than 24 (dots), the size of the each actual character image may be reduced to 75% or less of the same. FIGS. 21C and 22C show actual character images of "2" and "4" formed by reducing the actual character images of "2" (shown in FIG. 21B) and "4" (shown in FIG. 22B) to 75% thereof respectively (hereinafter, an actual character image reduced in size is referred to as "the reduced actual character image"). The reduction of each actual character image is carried out in a manner such that the dot matrix of the actual character image before reduction (hereinafter referred to as "the pre-reduction image") is divided into four groups each comprised of four columns of dots and each group of the pre-reduction image is caused to correspond to each group of the dot matrix of a reduced actual character image (hereinafter referred to as "the post-reduction image") which is formed by four groups comprised of three columns respectively. More specifically, the pre-reduction image is caused to correspond to the post-reduction image in a manner shown in the following TABLE 2.

TABLE 2

| PRE-REDUCTION IMAGE | POST-REDUCTION IMAGE |
|---|---|
| 1ST COLUMN | 1ST COLUMN |
| 2ND COLUMN + 3RD COLUMN | 2ND COLUMN |
| (2ND COLUMN.3RD COLUMN) + 4TH COLUMN | 3RD COLUMN |

+: logical sum (OR)
.: logical product (AND)

That is, a first column of the pre-reduction image is caused to correspond to a first column of the post-reduction image, the logical sum of a second column of the pre-reduction image and a third column thereof is caused to correspond to a second column of the post-reduction image, and the logical sum of the logical product of the second and third columns of the pre-reduction image and a fourth column of the same is caused to correspond to a third column of the post-reduction image. This makes it possible to reduce each actual character image having a dot number of 16 dots to one having a dot number of 12 dots to thereby obtain the reduced character string image "24" which is decreased in length of the character string from 32 dots to 24 dots.

Figure 21D:
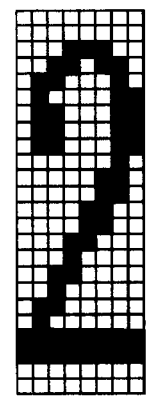
FIG. 21D is a diagram showing a dot matrix of the actual character image of the character image "2" reduced in size to 50% thereof.
Figure 22A:
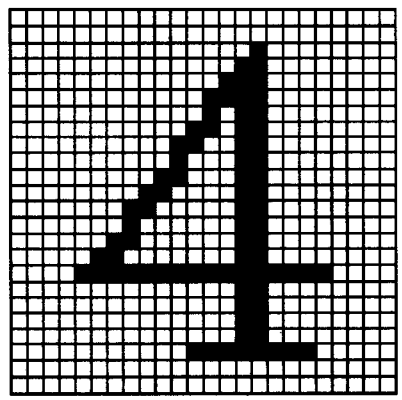
FIG. 22A is a diagram showing a dot matrix of the character image "4", which is similar to FIG. 19D.
Figure 22B:
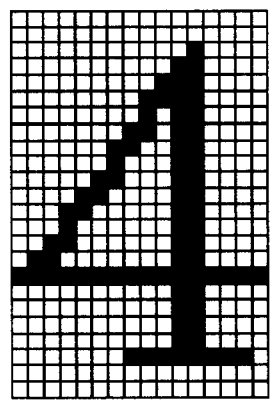
FIG. 22B is a diagram showing a dot matrix of an actual character image of the character image "4"
Figure 22C:
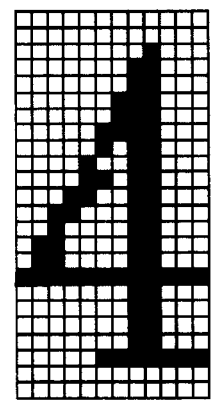
FIG. 22C is a diagram showing a dot matrix of the actual character image of the character image "4" reduced in size to 75% thereof.
Figure 22D:
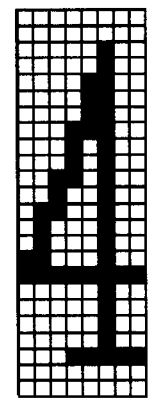
FIG. 22D is a diagram showing a dot matrix of the actual character image of the character image "4" reduced in size to 50% thereof.

FIGS. 21D and 22D show reduced character images each having a size reduced to 50% of the size of the actual character image of "2" (shown in FIG. 21B) and that of "4" (shown in FIG. 22B). When a character image together with blank images on a left-hand side and a right-hand side thereof is reduced in size as in the conventional method and device to obtain a character string image comprised of two characters and having a length of 24 dots, it is required to decrease each character having a dot number of 24 dots to 50% of the same, as shown in FIGS. 21D and 22D. According to the character string image-forming/processing method and device of the invention, however, it is possible to obtain a character string image comprised of two characters and having 24 dots or less without decreasing the size of each character image to 50% thereof, which prevents each character image from being excessively reduced in width thereof.

Figure 18:
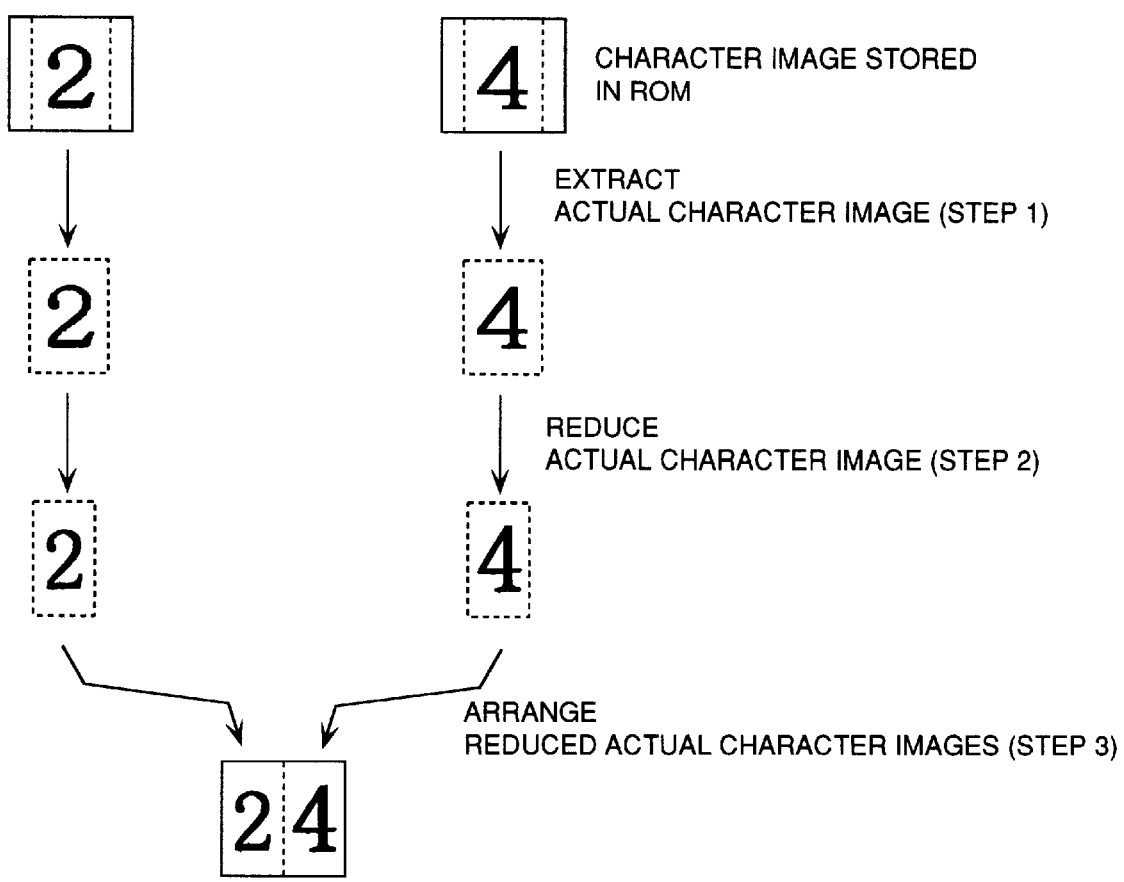
FIG. 18 is a diagram schematically showing an image of a process in which a character string image data item is created from image data items representative of two character images.
Figure 19A:
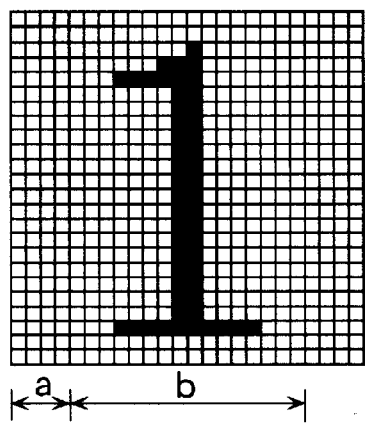
FIGS. 19A to 19E are diagrams showing dot matrices of character images "1" to "5"
Figure 19B:
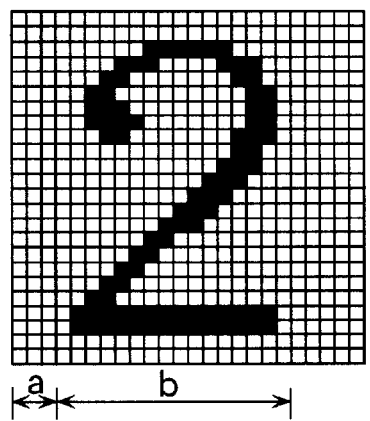
Figure 19C:
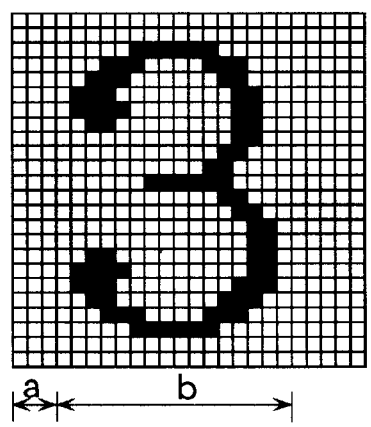
Figure 19D:
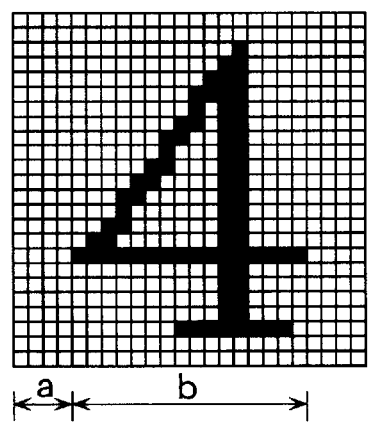
Figure 19E:
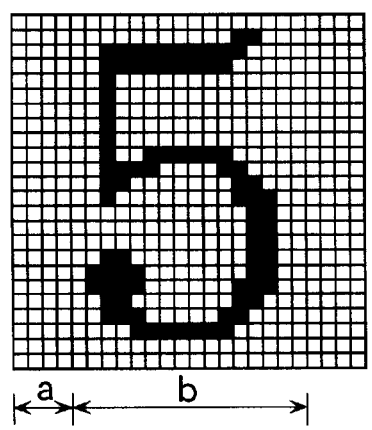
Figure 20A:
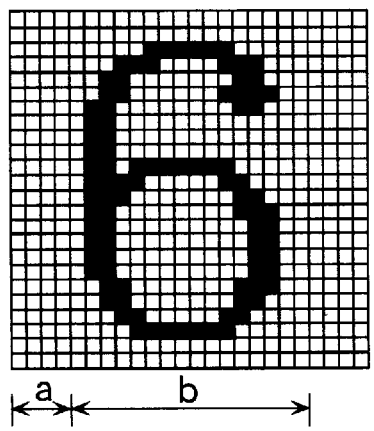
FIGS. 20A to 20E are diagrams showing dot matrices of character images "6" to "0"
Figure 20B:
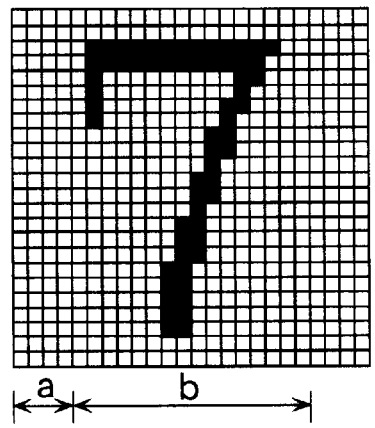
Figure 20C:
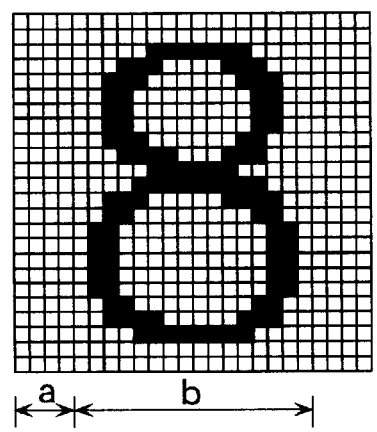
Figure 20D:
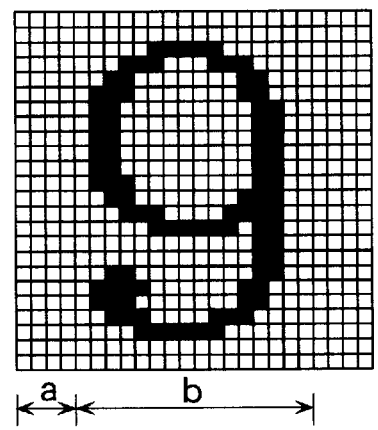
Figure 20E:
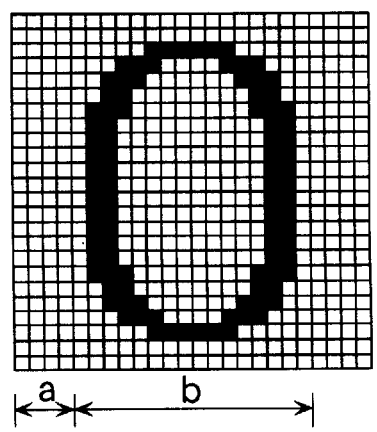

After reducing in size the actual character images of "2" and "4" in the above manner, data items representative of reduced images thereof are stored in the data-creating area of the RAM 303 to create a character string image data item such that the reduced actual character images of "2" and "4" are arranged in an image area for one character (S34 in FIG. 17, and STEP 3 in FIG. 18).

Each of the reduced actual character images of "2" and "4" is comprised of 12 dots, so that in a character string image formed based on the character string image data item created as above, the reduced actual character images are arranged in a horizontal sequence in a manner adjacent to each other without forming a gap therebetween.

Figure 23A:
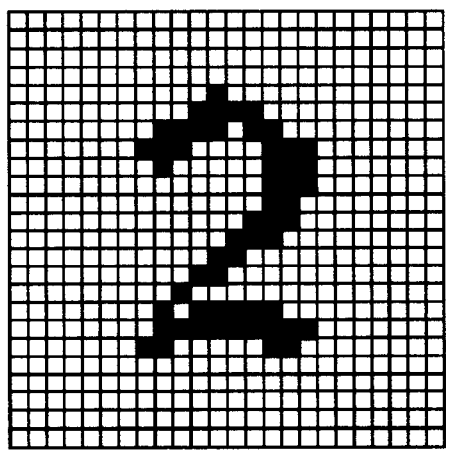
FIG. 23A is a diagram showing a dot matrix of an example ("2") in a CB typeface whose dot number of an actual character image is 10.
Figure 23B:
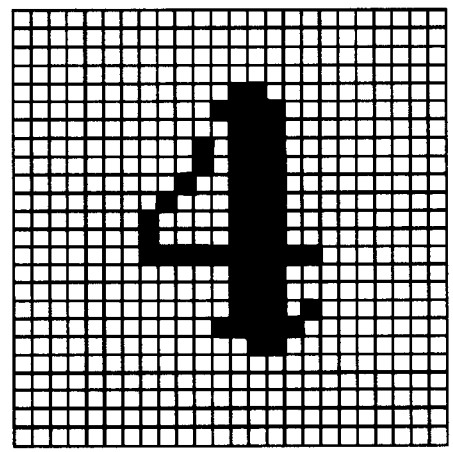
FIG. 23B is a diagram showing a dot matrix of another example ("4") in the CB typeface.

Further, depending on the kind of typeface, although a character image is formed by a dot matrix of 24×24 dots, an actual character image sometimes has a width smaller than that of each actual character image of the character images shown in FIGS. 19A to 20E. FIGS. 23A and 23B show examples of such character images (of "2" and "4") in a typeface in which the dot number a of a blank image on a left-hand side of an actual character image is 7 (dots), and the dot number b of the actual character image is 10 (dots) (hereinafter this kind of typeface is referred to as "the CB typeface").

When the character string image "24" is formed by the above CB typeface, the length of the character string "24" becomes equal to 20 dots which is smaller than the length (24 dots) of the image area for one character, so that it is possible to directly create data items of the character string image from actual image data thereof at step S34 in FIG. 17. In this case, actual character images of two character images ("2" and "4") are arranged in the image area for one character in the following manner.

Figure 24:
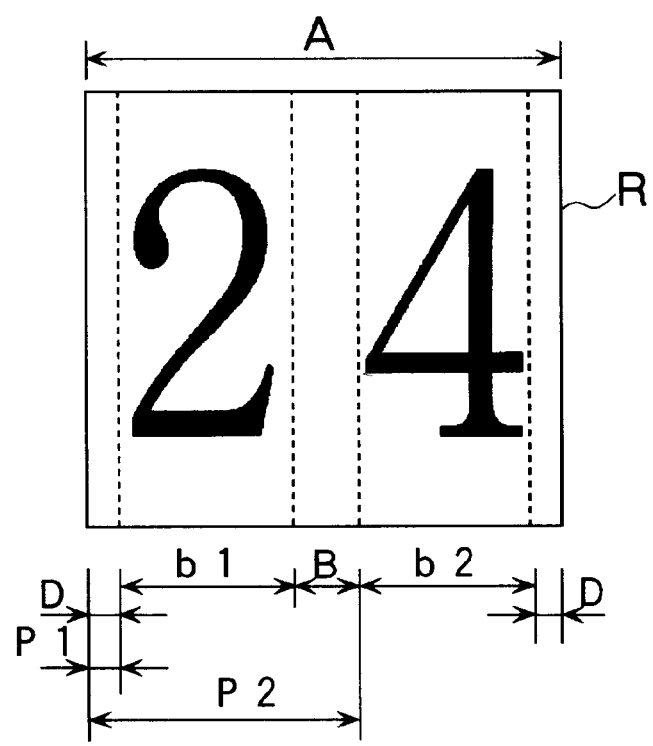
FIG. 24 is a diagram which is useful in explaining a case where two actual character images are arranged in an image area for one character.
Figure 25:
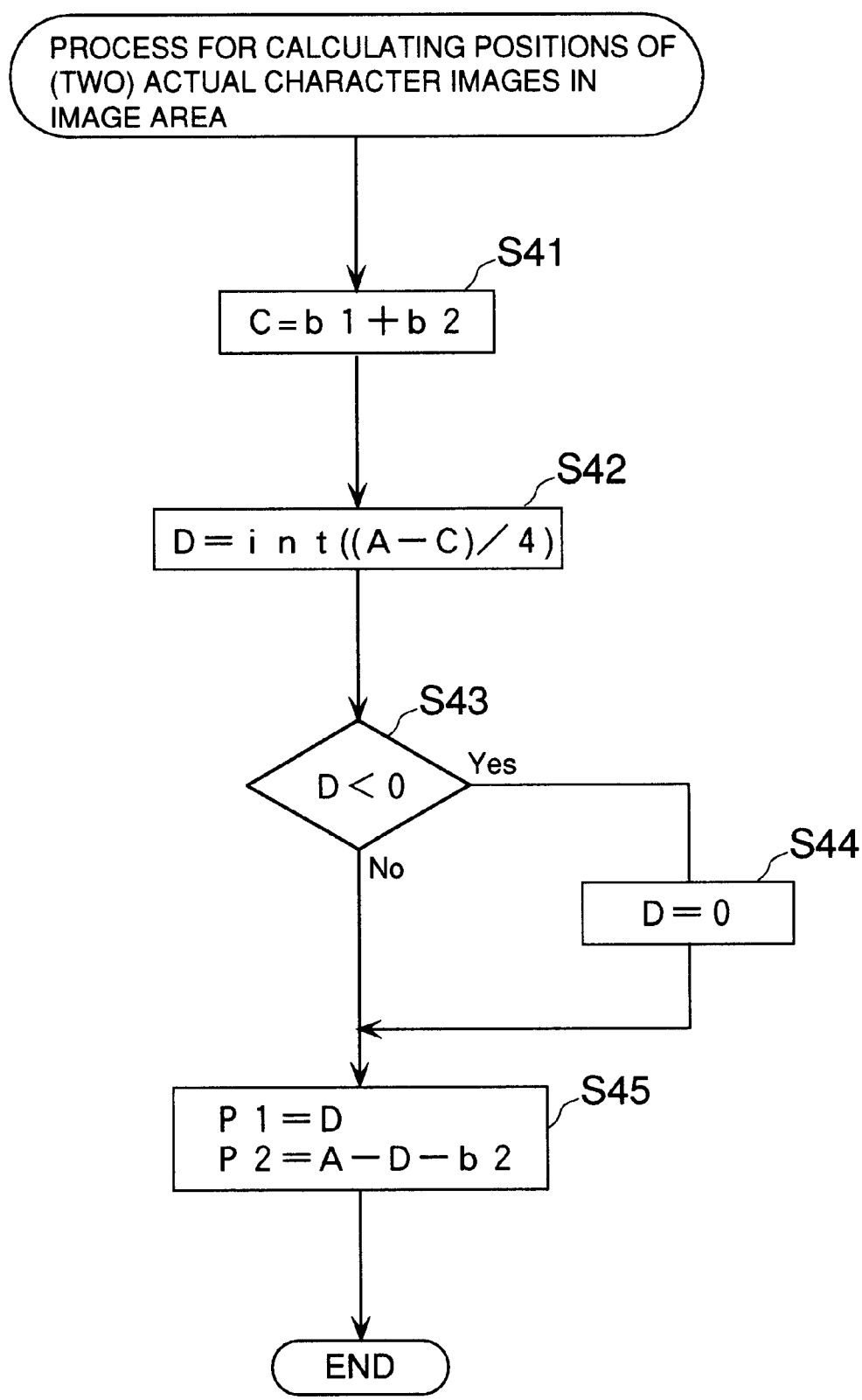
FIG. 25 is a flowchart showing a subroutine for calculating positions at which actual character images (2 characters) are to be arranged, respectively.

Referring to FIG. 24, assuming that the dot number of an image area is represented by R, the dot numbers of two actual character images are represented by b1 and b2, respectively, the dot number of a blank space (end portion blank space size) between a left end of the image area R and a left end of a left-hand one of the actual character images and the dot number of a blank space (end portion blank space size) between a right end of the image area R and a right end of a right-hand one of the actual character images are each represented by D, and the dot number of a space (inter-character blank space size) between the two actual character images is represented by B, positions of the respective actual character images in the image area, that is, a left end position p1 of the left-hand actual character image and a left end position p2 of the right-hand actual character image (assuming that the position of the left end of the image area R is set to 0), are calculated by a subroutine shown in FIG. 25.

That is, first, the dot numbers 1 and 2 of the actual character images are added and the resulting sum is assigned to a variable C at step S41. Then, the value of the variable C is subtracted from the dot number A of the image area R to obtain a total dot number (2D+B) of blank space portions of the image area R except for the actual character images. Next, the total dot number (2D+B) of the blank space portions is divided by 4 and an integral part of the quotient is set to the dot number D (end portion blank space size) at step S42. It should be noted that the total dot number (2D+B) of the blank space portions is divided by 4 so as to determine the dot number D (end portion blank space size) and the dot number B (inter-character blank space size) in a manner such that B becomes equal to 2D. It should be noted that "int ( )" of the equation "D=int ((A−c)/4)" at step S42 means an integral part of a value in the parenthesis.

Then, it is determined at step S43 whether or not the value of the dot number D (end portion blank space size) calculated at step S42 is positive. In this process, when the value of D is not negative, that is, when the value of D is equal to or more than 0, the same is maintained as it is, whereas when the value of D is negative, the same is set to 0 at step S44. Based on the results of the above processing, at step S45, a value of p1 is set to D, while a value of p2 is set to (A−D−b2). This makes it possible to calculate the left end positions p1 and p2 of the respective actual character images (see FIG. 24).

Therefore, when the actual character images in the CB typeface "2" and "4" (b1=b2=10 dots) are arranged in the image area for one character (A=24 dots), the left end positions p1 and p2 of the actual character images of "2" and "4" are set to 1 (=int ((24 −20)/4)) and 13 (=24−1−10)) respectively. In this case, the dot number D (end portion blank space size) is set to 1 (dot) and the dot number B (inter-character blank space size) is set to 2 (dots).

Of course, the user may arrange the actual character images in the CB typeface "2" and "4" in the above manner, while effecting the above actual character image reduction process, to thereby form the character string image. In this case, if an actual character image of 10 dots is reduced in size to e.g. 75% thereof, the reduced actual character image comes to be of 7.5 dots, which has a fractional portion. In such a case, the fractional portion is rounded up to obtain 8 dots. As a result, when the actual character images of "2" and "4" reduced in size to ones having a dot number of 8 (dots) are arranged in the image area for one character (A=24 dots), the left end positions p1 and p2 of the reduced actual character images "2" and "4" are set to 2 (=int ((24−16)/4)) and 14 (=24−2−8) respectively. In this case, the dot number D (end portion blank space size) is equal to 2 (dots) and the dot number B (inter-character blank space size) is equal to 4 (dots).

Next, an alternative method of forming a character string image in the image area for one character will be briefly described in which a left-side end of one of two actual character images and a right-side end of the other are placed in an overlapping manner. For purposes of ease of recognition of the overlapping portions of the two actual character images, character images of "9" and "0" are used by way of an example.

Figure 26A:
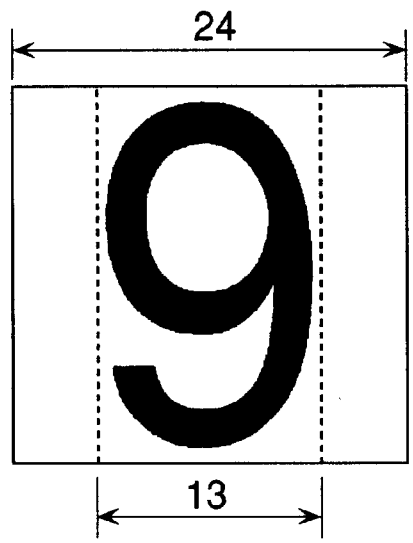
FIG. 26A shows a numerical character "9" in a Gothic typeface whose dot number of an actual character image is 13.
Figure 26B:
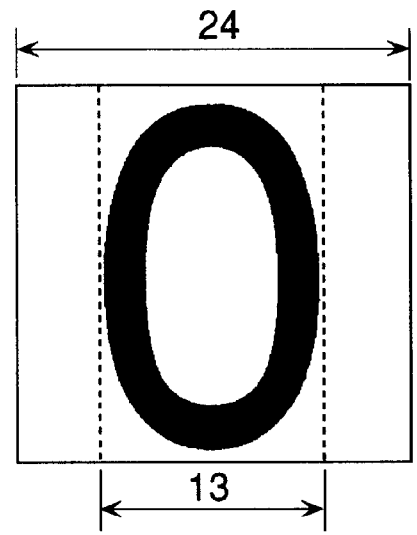
FIG. 26B shows a numerical character "0" in the Gothic typeface.

FIGS. 26A and 26B show character images in a Gothic typeface "9" and "0" each of which has an actual character image having a dot number of 13 dots. These character images are each formed or drawn by using a line having a width of approximately 2 to 3 dots. When the actual character images are taken out from the respective character images and arranged side by side without forming a gap therebetween, the resulting actual character image extends beyond the image area (24 dots) for one character by 2 (13+13−24) dots. Therefore, by placing a right-side end portion of the actual character image "9" and a left-side end portion of the actual character image "0" in a manner overlapping by 2 dots or more, it is possible to form a character string image of "90" in the image area for one character without reducing the actual character images (see FIG. 27), provided that the overlapping portion does not spoil the appearance of the resulting character string image.

Figure 27:
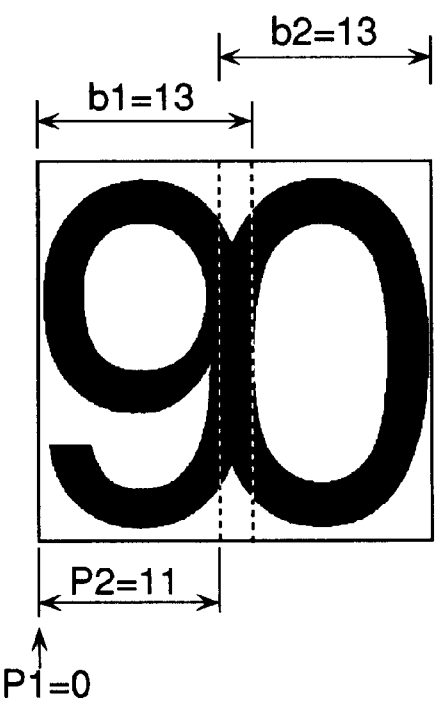
FIG. 27 shows a character string image "90" formed by placing end portions of actual character images "9" and "0" in an overlapping manner.
Figure 28:
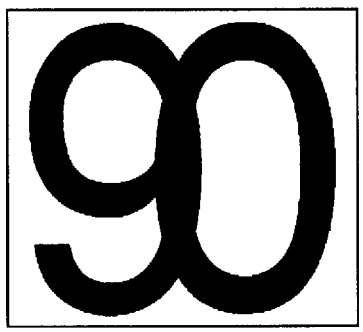
FIG. 28 shows a character string image "90" formed by placing the end portions of the actual character images "9" and "0" in an overlapping manner such that the width of the overlapping ends becomes larger than the width of a character line.

In this process, left end positions p1 and p2 of the actual character images "9" and "0" are calculated by the FIG. 25 subroutine. As shown in FIGS. 25 and 27, the dot number D (end portion blank space size) becomes equal to −0.5 (=int ((24−(13+13))/4)) at step S42 and hence the number 0 is substituted for D at step S44. As a result, the left end position p1 of the actual character image "9" is set to 0, whereas the left end position p2 of the actual character image 0 is set to 11 (=24−0−13). In case there is not provided a typeface having a dot number of 13 dots, such as one described above, characters in a font stored in the ROM 302 may be reduced as required to thereby form a reduced actual character image having a dot number of 13 (dots).

It should be noted that when side end portions of actual character images are placed in an overlapping manner as described above, if the width of the overlapping ends of the actual character images is larger than the line width of each actual character image, the side end portion of one actual character image extends beyond the line width of the actual character image into the inner blank area of the other actual character image, which results in spoiled appearance of the character string image. Therefore, when actual character images are caused to overlap each other as described above, it is preferable to set the width of the overlapping portion to a value smaller than the line width of actual character images.

Figure 29:
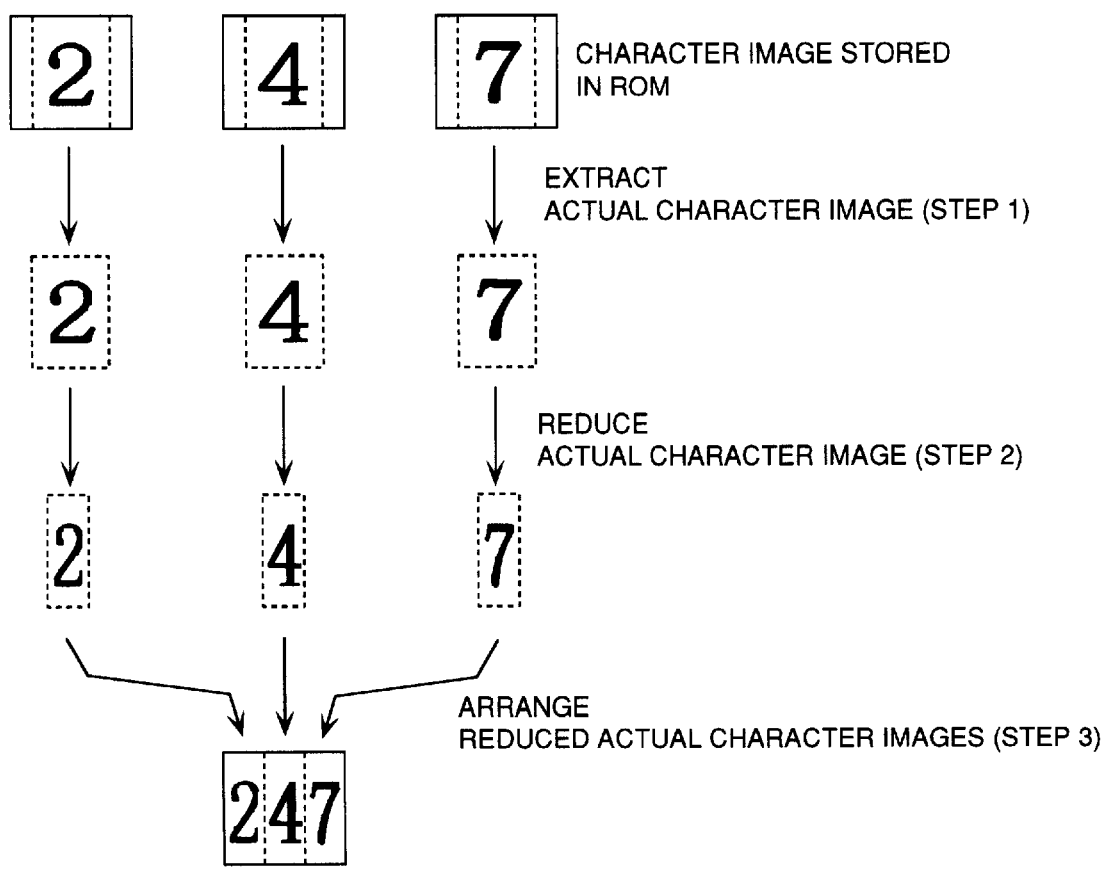
FIG. 29 is a diagram schematically showing an image of a process in which a character string image data item is created from data items representative of three character images.

Next, a manner of creating the character string of the 3-digit number "247" in the image area for one character will be described with reference to FIG. 17 and FIGS. 29 to 35. FIG. 29 is a diagram schematically showing an image of a process in which a character string image data item is formed in the RAM 303 from image data items of the character images "2", "4" and "7". As shown in the figure, after the 3-digit number "247" is entered, similarly to the case of entry of the 2-digit number, an actual image data item representative of a character image of each number is read out from the image data items of "2", "4" and "7" stored in the ROM 302 at step S31 in FIG. 17 (STEP 1 in FIG. 29).

Actual character images of the character images "2", "4" and "7" represented by the respective actual image data items are arranged in a horizontal sequence in a manner adjacent to each other without forming any gap therebetween to form a character string, and the length of the character string is compared with the length of the image area for one character by the CPU 301 to thereby determine at step S32 whether or not the length of the character string is larger than the length of the image area. In this embodiment, as shown in TABLE 1 referred to hereinabove, dot numbers of the actual character images of "2", "4" and "7" are all set to 16 (dots), and hence the length of the character string becomes equal to 48 (16+16+16) dots. Accordingly, to make the length of the character string equal to or smaller than 24 dots, each actual character image is required to be reduced to 50% or less of the same.

Figure 30A:
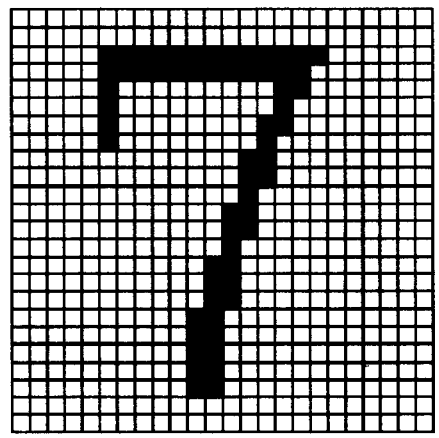
FIG. 30A is a diagram showing a dot matrix of the character image "7", which is similar to FIG. 20B.
Figure 30B:
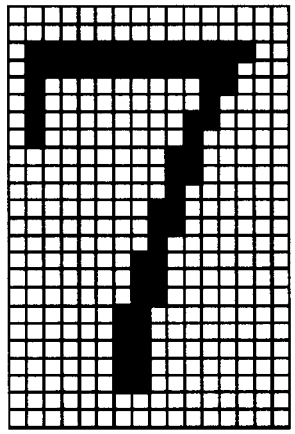
FIG. 30B is a diagram showing a dot matrix of an actual character image of the character image "7"
Figure 30C:
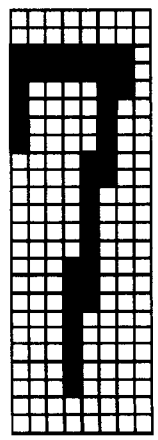
FIG. 30C is a diagram showing a dot matrix of the actual character image of the character image "7" reduced in size to 50% thereof.

FIGS. 21D, 22D and 30C show dot matrices of 24×8 dots of reduced actual character images of "2", "4" and "7" formed by reducing the actual character images of "2" (shown in FIG. 21B), "4" (shown in FIG. 22B) and "7" (shown in FIG. 30B) to 50% thereof. In this case, the reduction is carried out in a manner such that the dot matrix of each of the actual character images before reduction (pre-reduction image) is divided into eight groups each comprised of two columns and the logical sum (OR) of the dot number of the two columns in each group is determined to reduce each actual character image having a dot number of 16 dots to one having a dot number of 8 (dots) at step S33 in FIG. 17 (STEP 2 in FIG. 29).

Reduced image data items representative of the respective reduced actual character images of "2", "4" and "7" are stored in the data-creating area of the RAM 303 to create a character string image data item at step 34 in FIG. 17 (S3 in FIG. 29). Each of the reduced actual character images of "2", "4" and "7" has a dot number of 8 (dots), so that the character string image represented by the character string image data item created as above is formed by the reduced actual character images arranged in a horizontal sequence in a manner adjacent to each other without forming any gap therebetween.

Figure 31:
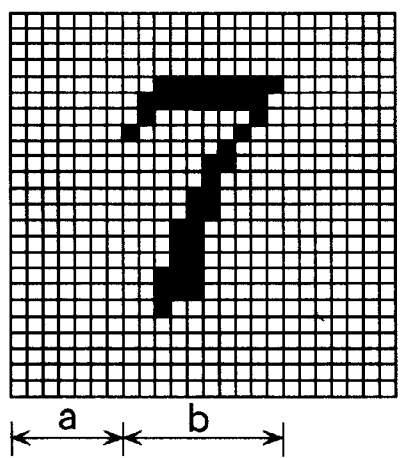
FIG. 31 is a diagram showing a dot matrix of an example ("7") in the CB typeface whose dot number of an actual character image is 10.

If the character string image "247" is formed by the above CB typeface, the length of the character string "247" becomes equal to 30 dots which is larger than the length (24 dots) of the image area for one character, so that each actual character image is reduced, for instance, to 50% thereof in the above-mentioned manner. In addition, FIG. 31 shows the character image "7" in the CB typeface formed by the dot matrix of 24×24 dots.

Figure 32:
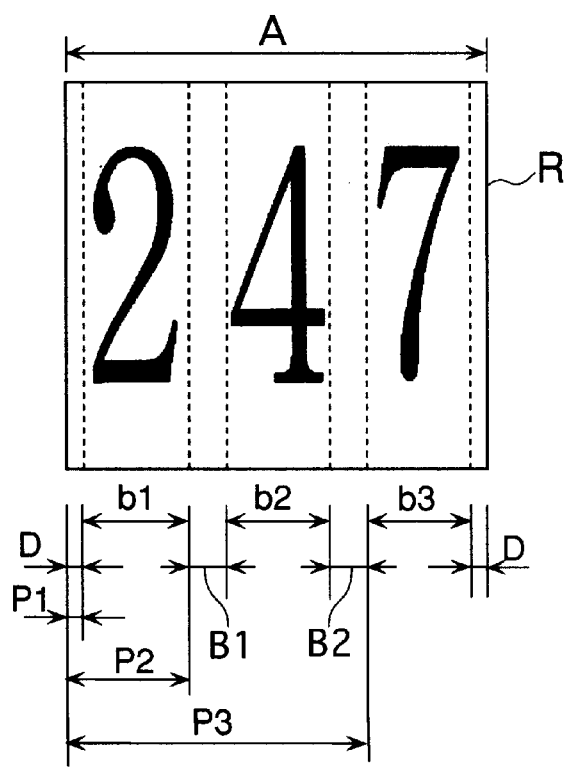
FIG. 32 is a diagram which is useful in explaining a case where three actual character images are arranged in an image area for one character.
Figure 33:
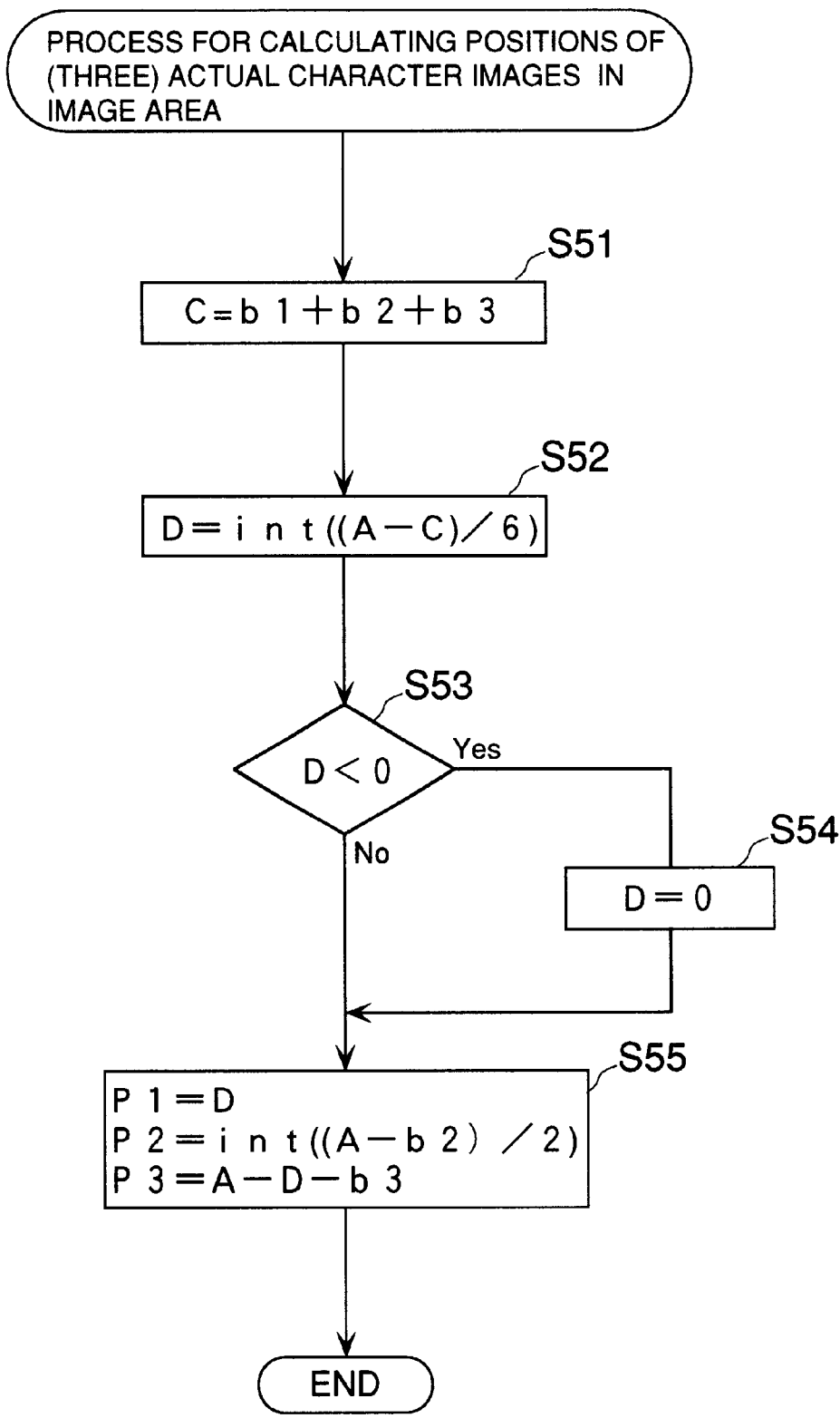
FIG. 33 is a flowchart showing a subroutine for calculating positions at which actual character images (3 characters) are to be arranged, respectively.

Referring to FIG. 32, assuming that the dot number of an image area is represented by R, the dot numbers of three actual character images are represented by b1, b2 and b3, respectively, the dot number of an end portion blank space size is represented by D, and the dot number of an inter-character blank space size is represented by B, left end positions p1, p2 and p3 of the reduced actual character images "2", "4" and "7" in the image area are calculated by a subroutine shown in FIG. 33.

That is, first, the dot numbers b1, b2 and b3 of the respective actual character images are added to each other and the resulting sum is assigned to the variable C at step S51. Then, the value of the variable C is subtracted from the dot number A of the image area R to obtain a total dot number (2D+B1+B2) of blank space portions of the image area R without the actual character images. Next, the total dot number (2D+B1+B2) of the blank space portions is divided by 6 to set an integral part of the quotient to the dot number D (end portion blank space size) at step S52. It should be noted that the dot total number (2D+B1+B2) of the blank space portions is divided by 6 so as to determine the dot number D (end portion blank space size) and the dot numbers B1 and B2 in a manner such that B is equal to 2D, provided that B1≈B2 (=B).

Then, it is determined at step S53 whether or not the value of the dot number D is positive. When the value of D is equal to or than 0, the same is maintained as it is, whereas when the value of D is negative, the same is set to 0 at step S54. And, based on the results of the above processing, the value of p1 is set to D, the value of p2 to int ((A−b2)/2) and further the value of p3 to (A−D −b3). This makes it possible to calculate the left end positions p1, p2 and p3 of the respective reduced actual character images.

Therefore, when the reduced actual character images in the CB typeface "2", "4" and "7" (b1=b2=b3=5 dots) are arranged in the image area for one character (A=24 dots), the left end positions p1, p2 and p3 of the respective reduced actual character images of "2", "4" and "7" are set to 1 (=int ((24−15)/6)), 9 (=(24−5)/2) and 18 (=24−1−5)). In this case, the dot number D (end portion blank space size) is set to 1 (dot) and the dot numbers B1, B2 (inter-character blank space sizes) to 3 (dots) and 4 (dots), respectively.

Next, an alternative method of forming a character string image in an image area for one character will be briefly described in which left-side ends and right-side ends of three actual character images are placed in an overlapping manner. In the description, character images of "9", "0" and "8" are used by way of an example.

Figures 34A, 34B, 34C:
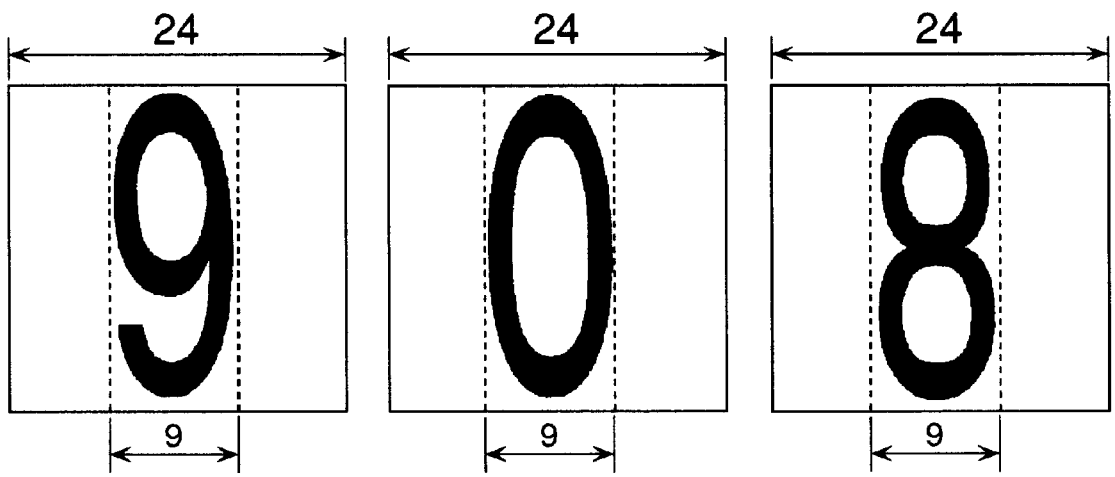
FIG. 34A shows a numerical character "9" in the Gothic typeface whose dot number of an actual character image is 9.
FIG. 34B shows a numerical character "0" in the Gothic typeface.
FIG. 34C shows a numerical character "8" in the Gothic typeface.

FIGS. 34A to 34C show character images in the Gothic typeface "9", "0" and "8" each of which has an actual character image having a dot number of 13 (dots). Each character image is formed or drawn by using a line having a width of approximately 1 to 2 dots. When the actual character images are taken out from the respective character images and arranged side by side without forming any gap therebetween, the resulting actual character image extends beyond the image area (24 dots) for one character by 3 (9+9+9−24) dots. Therefore, a right-side end portion of the actual character image "9" and a left-side end portion of the actual character image "0" are placed in a manner overlapping by 1 dot or more, and at the same time a right-side end portion of the actual character image "0" and a left-side end portion of the actual character image "8" are placed in a manner overlapping by 1 dot or more. Actually, there are produced two overlapping portions, and hence if an overlap by one dot is made at one portion, the other overlap by two dots is made at the other portion.

Figure 35:
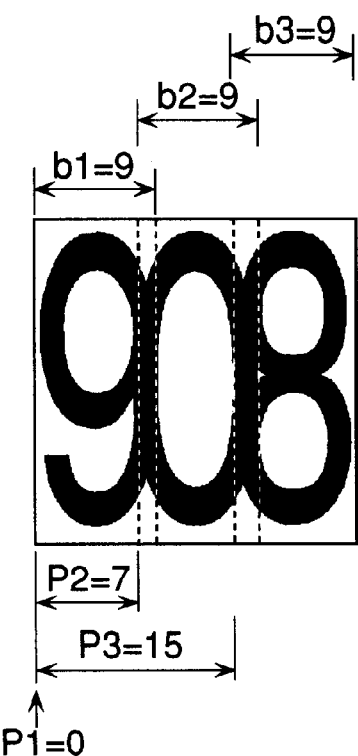
FIG. 35 shows a character string image "908" formed by placing end portions of the actual character images "9", "0" and "8" in an overlapping manner.
Figure 37A:
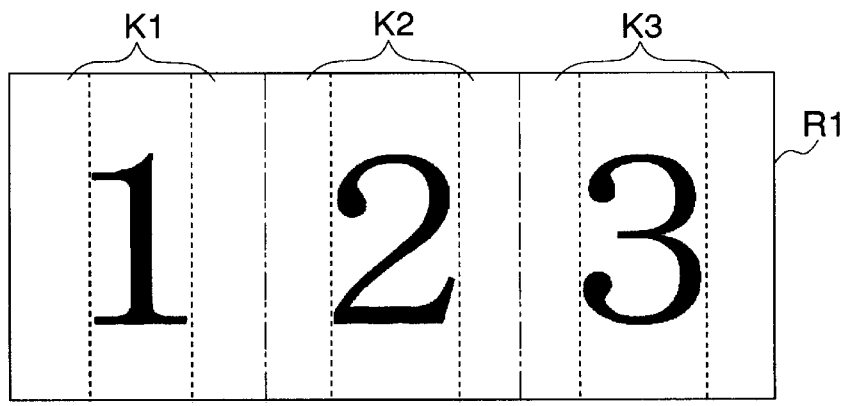
Figure 37B:
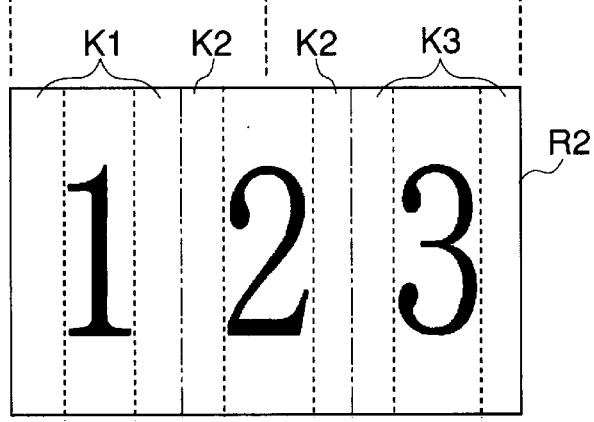
Figure 37C:
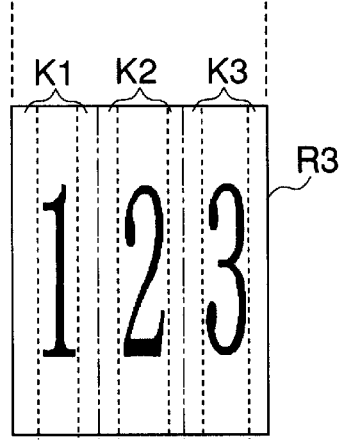

The end portions of the actual character images are placed in an overlapping manner as described above and if the overlapping portions do not spoil the appearance of the resulting character string image, it is possible to form a character string image of "908" in the image area for one character without reducing the actual character images (see FIG. 35).

In this process, left end positions p1, p2 and p3 of the actual character images "9", "0" and "8" are calculated by a subroutine shown in FIG. 33. As shown in FIGS. 33 and 35, the dot number D (end portion blank space size) becomes equal to −0.5 (=int ((24−27)/6)) at step S52 and hence the numerical character 0 is substituted for D at step S54. As a result, the left end position p1 of the actual character image "9" is set to 0, the left end position p2 of the actual character image "0" is set to 7 (=int((24−9)/2)) and the left end position p3 of the actual character image "8" is set to 15 (=24−0−9).

When the three actual character images are caused to overlap one after another as described above, similarly to the case where the two actual character images are caused to overlap each other, it is preferable to set the width of each the overlapping portion to a value smaller than the line width of actual character images.

The plate-making process is carried out on the character string image data created in the RAM 303 in the above manner, whereby a stamp image shown in FIG. 14B is formed on the ink ribbon C.

Next, a method of processing a character string image produced in the above manner will be described. When a stamp image in horizontal writing, including the above-mentioned character string images of "24" and "247" (see FIG. 14B), is converted to a stamp image in vertical writing, the character string images are handled similarly to other character images formed of one character, such as "C", "h", "i" and the like. That is, when the FIG. 14B stamp image is converted to one in vertical writing, for example, the character string images of "24" and "247" are rotated in the counterclockwise direction through 90 degrees.

More specifically, the matrices of the character string image data of "24" and "247" are converted by the CPU 301 (processing means) to produce converted data in which the character string images of "24" and "247" are rotated in the counterclockwise direction through 90 degrees.

This enables the character string images of "24" and "247" to remain in horizontal writing as appearing in FIG. 36A, even when the stamp image is converted to one in vertical writing on the whole, whereby the stamp image originally in horizontal writing can be displayed or printed in vertical writing without causing the user to feel a sense of disorder. In addition, each character of these character string images is prevented from being excessively thinned, whereby it is possible to prevent spoilage of the appearance of the character string images.

FIG. 36B shows a stamp image displayed when each character of the character string images "24" and "247" is handled separately and similarly to other character images. As shown in the figure, when each character of the character string images "24" and "247" is separately handled, these character are arranged in a vertical sequence to cause a sense of disorder. Moreover, the FIG. 36B stamp image requires a larger area than the FIG. 36A stamp image, which sometimes makes it impossible to form a stamp image on a stamp body having a stamping face limited in size.

This inconvenience is prevented from occurring if character string images are formed in the above-described manner.

The vertical writing is a character-arranging method generally employed in languages using ideograms (kanji), such as Japanese and Chinese. The advantageous effects of the present invention are marked in this method of arranging characters.

As described above, according to the present embodiment, actual character images are taken out from a plurality of character images and the plurality of actual character images are arranged in a desired manner in an image area for one character, without changing the original arrangement or by reducing them in size or causing them to overlap each other, so that it is possible to prevent character images from being excessively reduced in size, and hence prevent each character of a character string image from being excessively thinned. As a result, it is possible to form a character string image in the image area without spoiling the appearance thereof.

Although in the present embodiment, a predetermined image area for forming a character string image therein is described as an area for one character, this is not limitative, but the invention can be applied to a case where a character string image comprised of three or more characters is created in an image area for two characters or a case in which a character string image comprised of four or more characters is created in an image area for three characters.

Further, although in the present embodiment, description is made of an operation for forming a stamp image in a stamp making apparatus, this is not limitative, but the invention can be employed for screen display in a personal computer or print display in a printer. Furthermore, it goes without saying that according to the invention, a character string image can be formed from character images created based on an outline font as well as a dot matrix font.

It is further understood by those skilled in the art that the foregoing is a preferred embodiment of the invention, and that various changes and modifications may be made without departing from the spirit and scope thereof.

What is claimed is:

1. A method of forming a character string image in a predetermined image area based on a plurality of character images each occupying an area for one character, each of said character images being formed of an actual character image and blank images arranged on horizontally opposite sides of said actual character image in a manner immediately adjacent thereto, the method comprising the steps of:

taking out actual character images from said character images, respectively;

arranging the thus taken-out actual character images in said predetermined image area according to a desired sequence, to thereby form said character string image;

calculating a total sum of lengths of said actual character images; and reducing a size of each of said actual character images in a manner such that said total sum of lengths of said actual character images becomes equal to or smaller than a length of said predetermined image area, if said total sum of lengths of said actual character images is larger than said length of said predetermined image area.

2. A method according to claim 1, wherein D is the width of a blank space between an outermost one of said actual character images arranged in said predetermined image area and a corresponding side edge of said predetermined image area, B is the width of a blank space between each pair of adjacent ones of said actual character images, and said step of arranging said actual character images includes arranging said actual character images in said predetermined image area in a manner such that B=2D.

3. A method of forming a character string image in a predetermined image area based on a plurality of character images each occupying an area for one character, each of said character images being formed of an actual character image and blank images arranged on horizontally opposite sides of said actual character image in a manner immediately adjacent thereto, the method comprising the steps of:

taking out actual character images from said character images, respectively;

arranging the thus taken-out actual character images in said predetermined image area according to a desired sequence, to thereby form said character string image;

calculating a total sum of lengths of said actual character images; and comparing said total sum of lengths of said actual character images with a length of said predetermined image area, and wherein the step of arranging said actual character images includes placing opposed end portions of adjacent ones of said actual character images in an overlapping manner such that said total sum of lengths of said actual character images becomes equal to or smaller than said length of said predetermined image area, if said total sum of lengths of said actual character images is larger than said length of said predetermined image area.

4. A method according to claim 3, wherein a width of an overlapping portion of said opposed end portions of said adjacent ones is equal to or smaller than a width of each character-forming line of said actual character images.

5. A method according to claim 1, wherein said plurality of character images are two character images, and said predetermined image area is an image area for one character.

6. A method according to claim 1, wherein said plurality of character images are three character images, and said predetermined image area is an image area for one character.

7. A character string image-forming device for forming a character string image in a predetermined image area based on a plurality of character images each occupying an area for one character, each of said character images being formed of an actual character image and blank images arranged on horizontally opposite sides of said actual character image in a manner immediately adjacent thereto, the character image-forming device comprising:

storage means for storing image data items of said respective character images;

reading means for reading out actual character image data items representative of actual character images from said respective image data items;

arrangement means for arranging actual character images corresponding to the thus read-out actual character image data items in said predetermined image area according to a desired sequence;

calculation means for calculating a total sum of lengths of said actual character images;

comparison means for comparing said total sum of lengths of said actual character images with a length of said predetermined image area; and reducing means for reducing a size of each said actual character images in a manner such that said total sum of lengths of said actual character images becomes equal to or smaller than a length of said predetermined image area, if said total sum of lengths of said actual character images is larger than said length of said predetermined image area.

8. A character string image-forming device to claim 7, wherein D is the width of a blank space between an outermost one of said actual character images arranged in said predetermined image area and a corresponding side edge of said predetermined image area, B is the width of a blank space between each pair of adjacent ones of said actual character images, and said arrangement means includes means for arranging said actual character images in said predetermined image area in a manner such that B=2D.

9. A character string image-forming device for forming a character string image in a predetermined image area based on a plurality of character images each occupying an area for one character, each of said character images being formed of an actual character image and blank images arranged on horizontally opposite sides of said actual character image in a manner immediately adjacent thereto, the character image-forming device comprising:

storage means for storing image data items of said respective character images;

reading means for reading out actual character image data items representative of actual character images from said respective image data items;

arrangement means for arranging actual character images corresponding to the thus read-out actual character image data items in said predetermined image area according to a desired sequence;

calculation means for calculating a total sum of lengths of said actual character images; and comparison means for comparing said total sum of lengths of said actual character images with a length of said predetermined image area; and wherein said arrangement means includes means for placing opposed end portions of adjacent ones of said actual character images in an overlapping manner such that said total sum of lengths of said actual character images becomes equal to or smaller than said length of said predetermined image area, if said total sum of lengths of said actual character images is larger than said length of said predetermined image area.

10. A character string image-forming device according to claim 9, wherein a width of an overlapping portion of said opposed end portions of said adjacent ones is equal to or smaller than a width of each character-forming line of said actual character images.

11. A character string image-forming device according to claim 7, wherein said plurality of character images are two character images, and said predetermined image area is an image area for one character.

12. A character string image-forming device according to claim 7, wherein said plurality of character images are three character images, and said predetermined image area is an image area for one character.

13. A method of processing a character string image, comprising the steps of:

taking out actual character images from a plurality of character images, respectively, said character images each occupying an area for one character and being formed of an actual character image and blank images arranged on horizontally opposite sides of said actual character image in a manner immediately adjacent thereto;

arranging the thus taken-out actual character images in a predetermined image area according to a desired sequence, to thereby form a character string image;

handling the thus formed character string image as an equivalent to an image of one character;

calculating a total sum of lengths of said actual character images; and reducing a size of each of said actual character images in a manner such that said total sum of lengths of said actual character images becomes equal to or smaller than a length of said predetermined image area, if said total sum of lengths of said actual character images is larger than said length of said predetermined image area.

14. A method of processing a character string image, comprising the steps of:

taking out actual character images from a plurality of character images, respectively, said character images each occupying an area for one character and being formed of an actual character image and blank images arranged on horizontally opposite sides of said actual character image in a manner immediately adjacent thereto;

arranging the thus taken-out actual character images in a predetermined image area according to a desired sequence, to thereby form a character string image;

handling the thus formed character string image as an equivalent to an image of one character;

calculating a total sum of lengths of said actual character images; and comparing said total sum of lengths of said actual character images with a length of said predetermined image area; and wherein the step of arranging said actual character images includes placing opposite end portions of adjacent ones of said actual character images in an overlapping manner such that said total sum of lengths of said actual character images becomes equal to or smaller than said length of said predetermined image area, if said total sum of lengths of said actual character images is larger than said length of said predetermined image area.

15. A character string image-processing device comprising:

storage means for storing image data items of said respective character images;

reading means for reading out actual character image data items representative of actual character images from said respective image data items;

arrangement means for arranging actual character images corresponding to the thus read-out actual character image data items in said predetermined image area according to a desired sequence to thereby form a character string image;

handling means for handling the thus formed character string image as an equivalent to an image of one character;

calculation means for calculating a total sum of lengths of said actual character images;

comparison means for comparing said total sum of lengths of said actual character images with a length of said predetermined image area; and reducing means for reducing a size of each of said actual character images in a manner such that said total sum of lengths of said actual character images becomes equal to or smaller than a length of said predetermined image area, if said total sum of lengths of said actual character images is larger than said length of said predetermined image area.

16. A character string image-processing device comprising:

storage means for storing image data items of said respective character images;

reading means for reading out actual character image data items representative of actual character images from said respective image data items;

arrangement means for arranging actual character images corresponding to the thus read-out actual character image data items in said predetermined image area according to a desired sequence to thereby form a character string image;

handling means for handling the thus formed character string image as an equivalent to an image of one character;

calculation means for calculating a total sum of lengths of said actual character images; and comparison means for comparing said total sum of lengths of said actual character images with a length of said predetermined image areas; and wherein said arrangement means include means for placing opposed end portions of adjacent ones of said actual character images in an overlapping manner such that said total sum of lengths of said actual character images becomes equal to or smaller than said length of said predetermined image area, if said total sum of lengths of said actual character images is larger than said length of said predetermined image area.

* * * * *